US012093955B2

(12) United States Patent
Lee et al.

(10) Patent No.: US 12,093,955 B2
(45) Date of Patent: Sep. 17, 2024

(54) ELECTRONIC DEVICE AND PAYMENT METHOD USING THE SAME

(71) Applicant: Samsung Electronics Co., Ltd., Suwon-si (KR)

(72) Inventors: Gawon Lee, Suwon-si (KR); Daehaeng Cho, Suwon-si (KR); Seunghyeon Cho, Suwon-si (KR); Jongsu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 17/903,564

(22) Filed: Sep. 6, 2022

(65) Prior Publication Data

US 2023/0114336 A1    Apr. 13, 2023

Related U.S. Application Data

(63) Continuation of application No. PCT/KR2022/012973, filed on Aug. 30, 2022.

(30) Foreign Application Priority Data

Oct. 7, 2021   (KR) .................. 10-2021-0133473
Mar. 29, 2022  (KR) .................. 10-2022-0038675

(51) Int. Cl.
*G06Q 20/40*         (2012.01)
(52) U.S. Cl.
CPC ....... *G06Q 20/4014* (2013.01); *G06Q 20/405* (2013.01)
(58) Field of Classification Search
CPC .................................................. G06Q 20/4014
(Continued)

(56) References Cited

U.S. PATENT DOCUMENTS 10,546,302 B2 *  1/2020  Zovi .................. G06Q 20/4016
10,796,294 B2   10/2020  Van Os et al.
(Continued)

FOREIGN PATENT DOCUMENTS

CN        106875186 A      6/2017
CN        112950193 A      6/2021
(Continued)

OTHER PUBLICATIONS

International Search Report dated Dec. 13, 2022, issued in International Patent Application No. PCT/KR2022/012973.

*Primary Examiner* — Cho Kwong
(74) *Attorney, Agent, or Firm* — Jefferson IP Law, LLP

(57) ABSTRACT

An electronic device is provided. The electronic device includes a communication module communicable with an external device, a display, a memory, and at least one processor operatively connected to the communication module, wherein the at least one processor is configured to display at least one image and/or text related to payment information on the display in response to at least a part of a user input, determine whether to start a payment process in response to identification of a user authentication, transmit a first signal for requesting an authentication to the external device in response to identification of an approach of the external device within a predetermined distance from the electronic device, and transmit a second signal related to the payment process in response to identification of an authentication of the external device, and determine whether to complete the payment process using the electronic device.

20 Claims, 20 Drawing Sheets

(58) Field of Classification Search
USPC .......................................................... 705/44
See application file for complete search history.

(56) References Cited

U.S. PATENT DOCUMENTS

| | | |
|---|---|---|
| 11,195,167 B2 | 12/2021 | Sun |
| 2017/0193498 A1 | 7/2017 | Metral et al. |
| 2019/0102770 A1 | 4/2019 | Kim et al. |

FOREIGN PATENT DOCUMENTS

| | | |
|---|---|---|
| JP | 5457743 B2 | 4/2014 |
| JP | 2020-522826 A | 7/2020 |
| JP | 2021-111307 A | 8/2021 |
| KR | 10-2008-0044559 A | 5/2008 |
| KR | 10-2011-0006159 A | 1/2011 |
| KR | 10-1656500 B1 | 9/2016 |
| KR | 10-2017-0110449 A | 10/2017 |

* cited by examiner

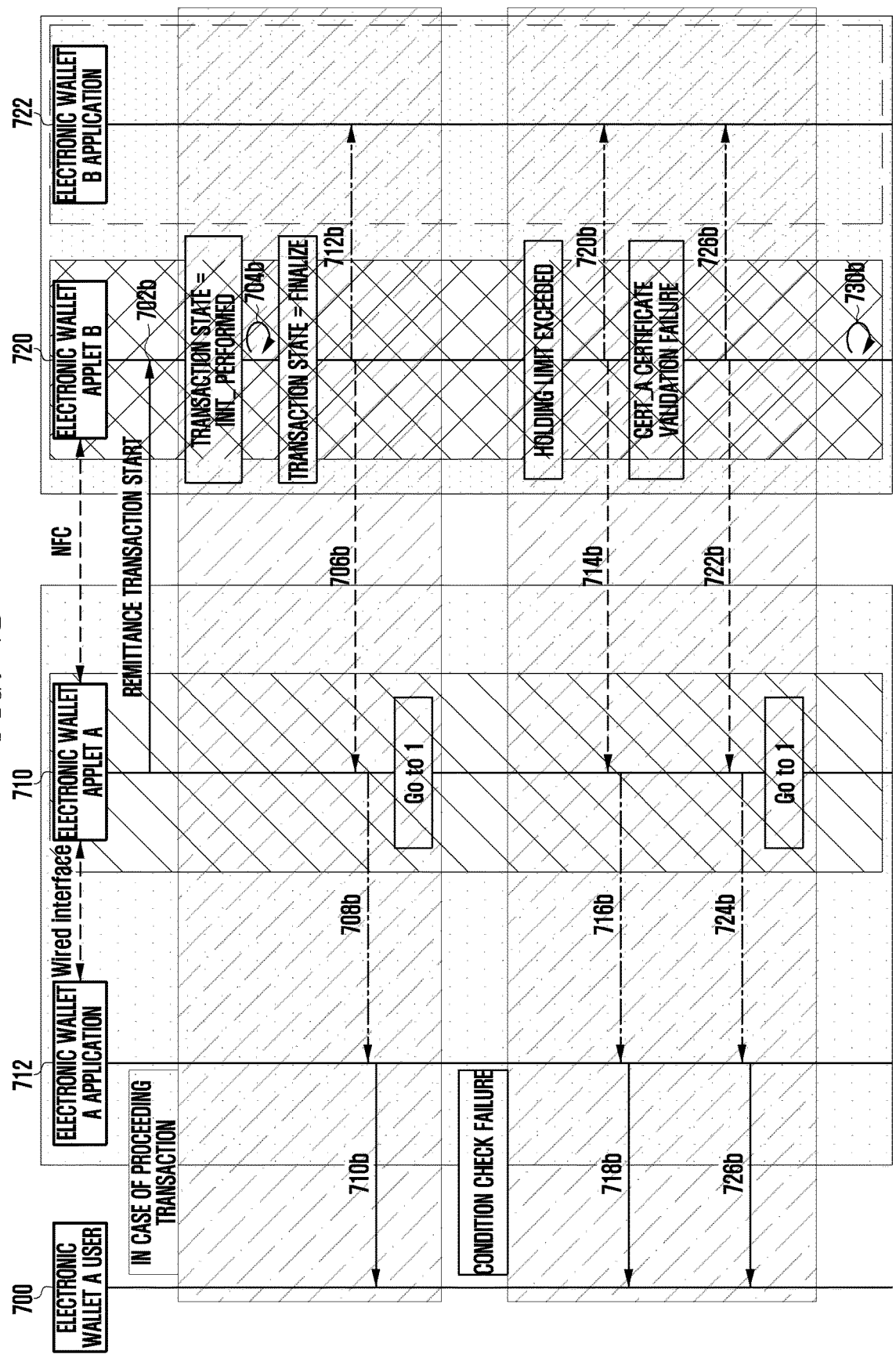

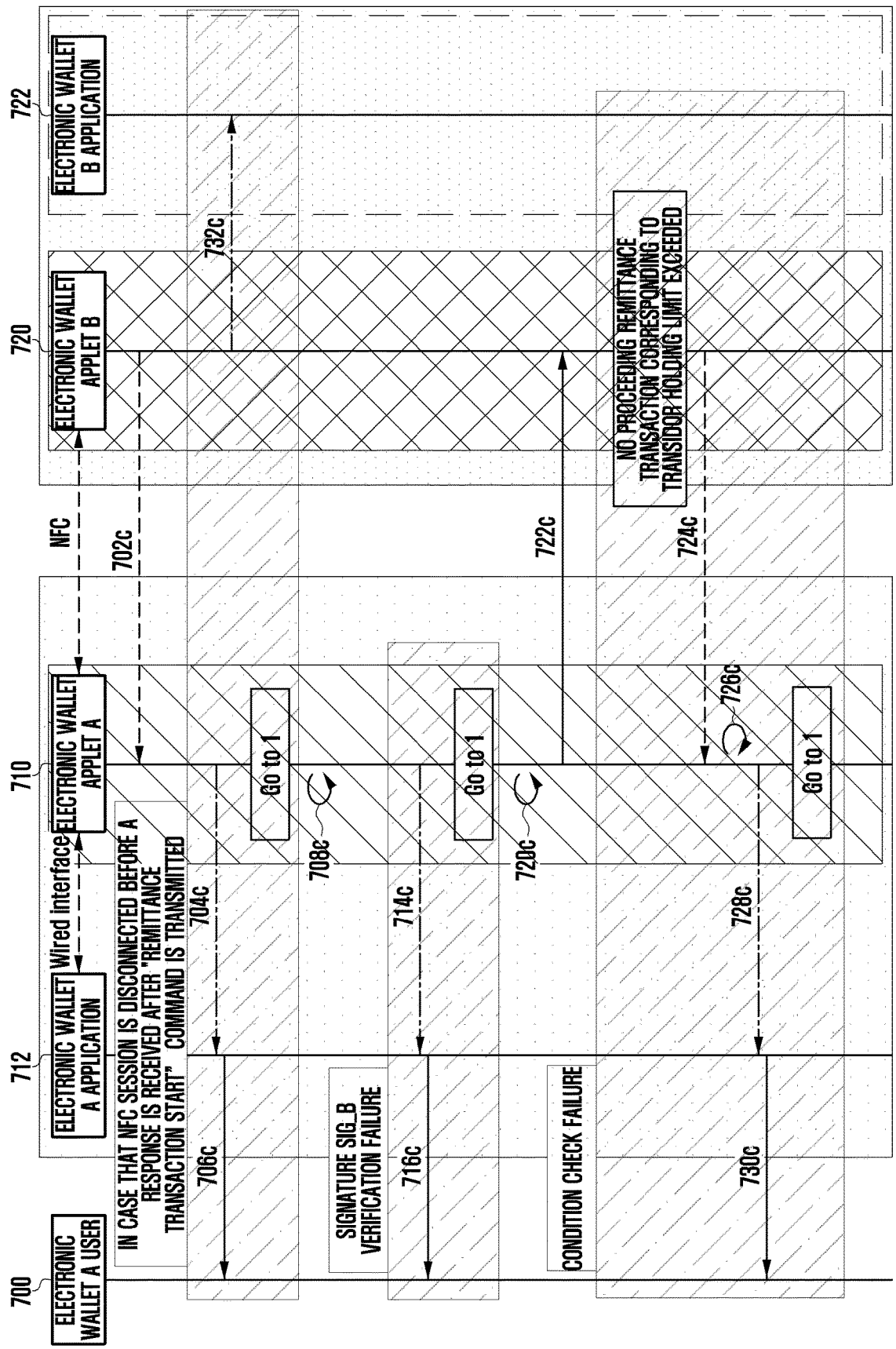

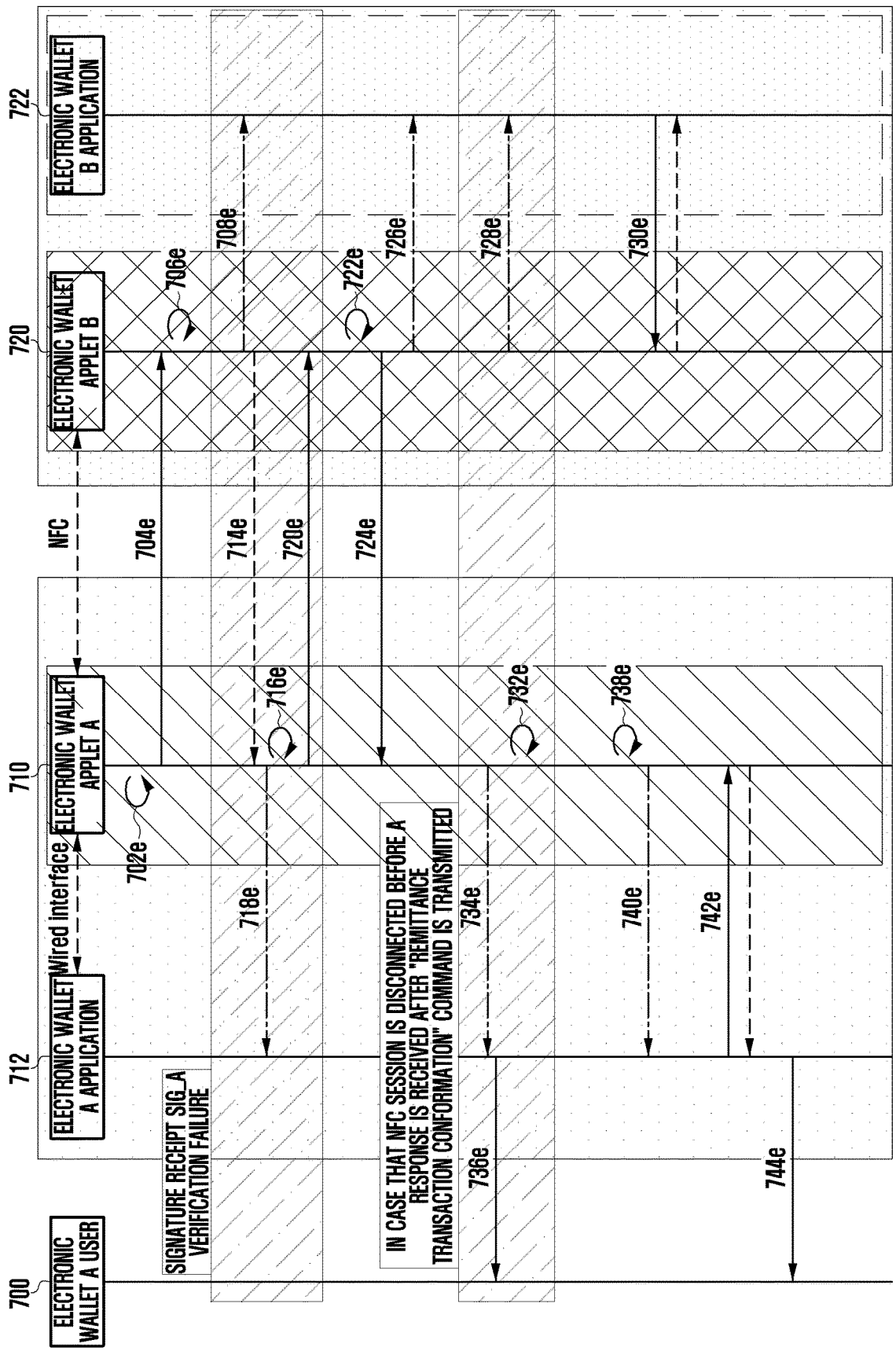

ELECTRONIC DEVICE AND PAYMENT METHOD USING THE SAME

CROSS-REFERENCE TO RELATED APPLICATION(S)

This application is a continuation application, claiming priority under § 365(c), of an International application No. PCT/KR2022/012973, filed on Aug. 30, 2022, which is based on and claims the benefit of a Korean patent application No. 10-2021-0133473, filed on Oct. 7, 2021, in the Korean Intellectual Property Office, and of a Korean patent application No. 10-2022-0038675, filed on Mar. 29, 2022, the disclosure of each of which is incorporated by reference herein in its entirety.

TECHNICAL FIELD

The disclosure relates to an electronic device, and may include a payment transfer method between electronic devices. More particularly, the disclosure relates to a method and an apparatus, in which an electronic device transmits payment and non-payment information being provided through various wallet applications to another external device.

BACKGROUND ART

With the spread of various electronic devices, such as a smart phone, a tablet personal computer (PC), a portable multimedia player (PMP), a personal digital assistant (PDA), a laptop personal computer (laptop PC), and a wearable device, interests have been increased in a technology to perform a simple payment by using various electronic devices.

For example, a technology has also been developed, which performs a simple payment by using communication with a payment terminal (point of sale (POS)) through a near field communication module included in an electronic device. Further, a technology has also been developed, which performs a simple payment in a manner that an electronic device outputs a magnetic stripe transmission (MST) signal that is a magnetic field signal being generated during swiping of a payment card (e.g., a credit card, a debit card, or a check card) that is the existing payment means in the payment terminal, and the payment terminal recognizes the output magnetic field.

In case of the technology in which the electronic device outputs the MST signal that is the same magnetic field signal as the magnetic field being generated during the swiping of the payment card on the payment terminal, it can be used in the existing payment terminal even without an additional device, and thus has been widely spread.

Further, as a worldwide cash alternative means, a need for a central bank digital currency (CBDC) that is a digital currency being issued and managed by Central bank has arisen, and in this case, a base technology being considered is a block chain based online CBDC.

The above information is presented as background information only to assist with an understanding of the disclosure. No determination has been made, and no assertion is made, as to whether any of the above might be applicable as prior art with regard to the disclosure.

DISCLOSURE

Technical Problem

Since the central bank digital currency (CBDC) that operates on online essentially requires a network connection, it may have a problem in that it is difficult to proceed with a payment in a situation where the network does not operate (e.g., disaster situation). For example, it may be difficult that the online CBDC serves as a means for replacing cash in a specific situation.

Therefore, in order for the CBDC to replace cash, an offline CBDC technology capable of performing a payment even in an offline situation may be necessary. However, the existing payment system has the limits in that the payment is possible only in case that at least one electronic device (e.g., point of sales (POS) device) is always connected to a network, and thus in case that both electronic devices that participate in the payment are offline, the payment is not possible.

Aspects of the disclosure are to address at least the above-mentioned problems and/or disadvantages and to provide at least the advantages described below. Accordingly, as aspect of the disclosure is to provide an electronic device and a payment method using the same.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication module communicable with an external device, a display, a memory, and at least one processor. The at least one processor may be configured to display at least one image and/or text related to payment information on the display in response to at least a part of a user input, determine whether to start a payment process using the electronic device in response to identification of a user authentication, transmit a first signal for requesting an authentication to the external device in response to identification of an approach of the external device within a predetermined distance from the electronic device and transmit a second signal related to the payment process by using the communication module in response to identification of an authentication of the external device, determine whether to complete the payment process using the electronic device in response to identification of a response of the external device for the second signal and transmit a third signal for indicating that the payment process has been completed to the external device by using the communication module in response to determination of a completion of the payment process, and control the external device to be in an untradeable state in response to a case where the response of the external device for the third signal is unable to be identified within a predetermined time after the third signal is transmitted.

In accordance with another aspect of the disclosure, a payment method using an electronic device is provided. The payment method includes displaying at least one image and/or text related to payment information on the display in response to at least a part of a user input, determining whether to start a payment process using the electronic device in response to identification of a user authentication, transmitting a first signal for requesting an authentication to an external device by using a communication module in response to identification of an approach of the external device within a predetermined distance from the electronic device, transmitting a second signal related to the payment process by using the communication module in response to identification of an authentication of the external device, determining whether to complete the payment process using the electronic device in response to identification of a response of the external device for the second signal, and transmitting a third signal for indicating that the payment process has been completed to the external device by using the communication module in response to determination of a completion of the payment process, and controlling the external device to be in an untradeable state in response to a case where the response of the external device for the third signal is unable to be identified within a predetermined time after the third signal is transmitted.

Advantageous Effects

According to the various embodiments of the disclosure, the electronic device can complete transactions of both sides even in case of an offline state when participating in the payment.

Further, the electronic device can prevent double spending even in an offline state, and can prevent forgery of transactions of the other party. The electronic device can prevent an occurrence of counterfeit money that may occur due to a difference between transaction information of any one side and transaction information of the other side.

According to various embodiments of the disclosure, the electronic device can control to perform the payment with mutual trust by designing the payment system so that the transaction can be normally completed even in case that the payment is not completed due to an arbitrary detach of the terminal during the payment.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIGS. 7A, 7B, 7C, 7D, and 7E illustrate a transaction process and an error situation on offline of an electronic device according to various embodiments of the disclosure;

Throughout the drawings, like reference numerals will be understood to refer to like parts, components, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
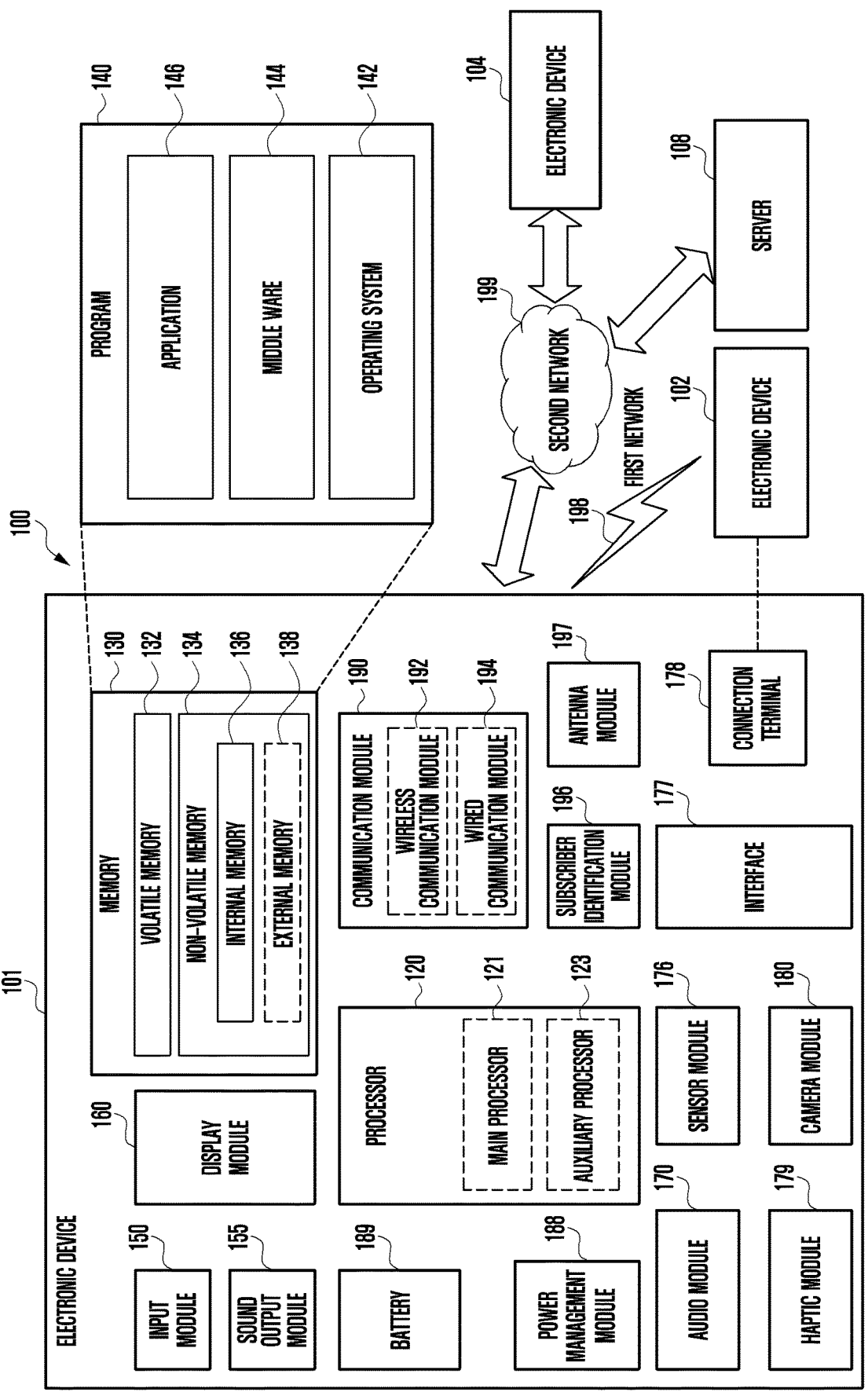
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the displays, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smailphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
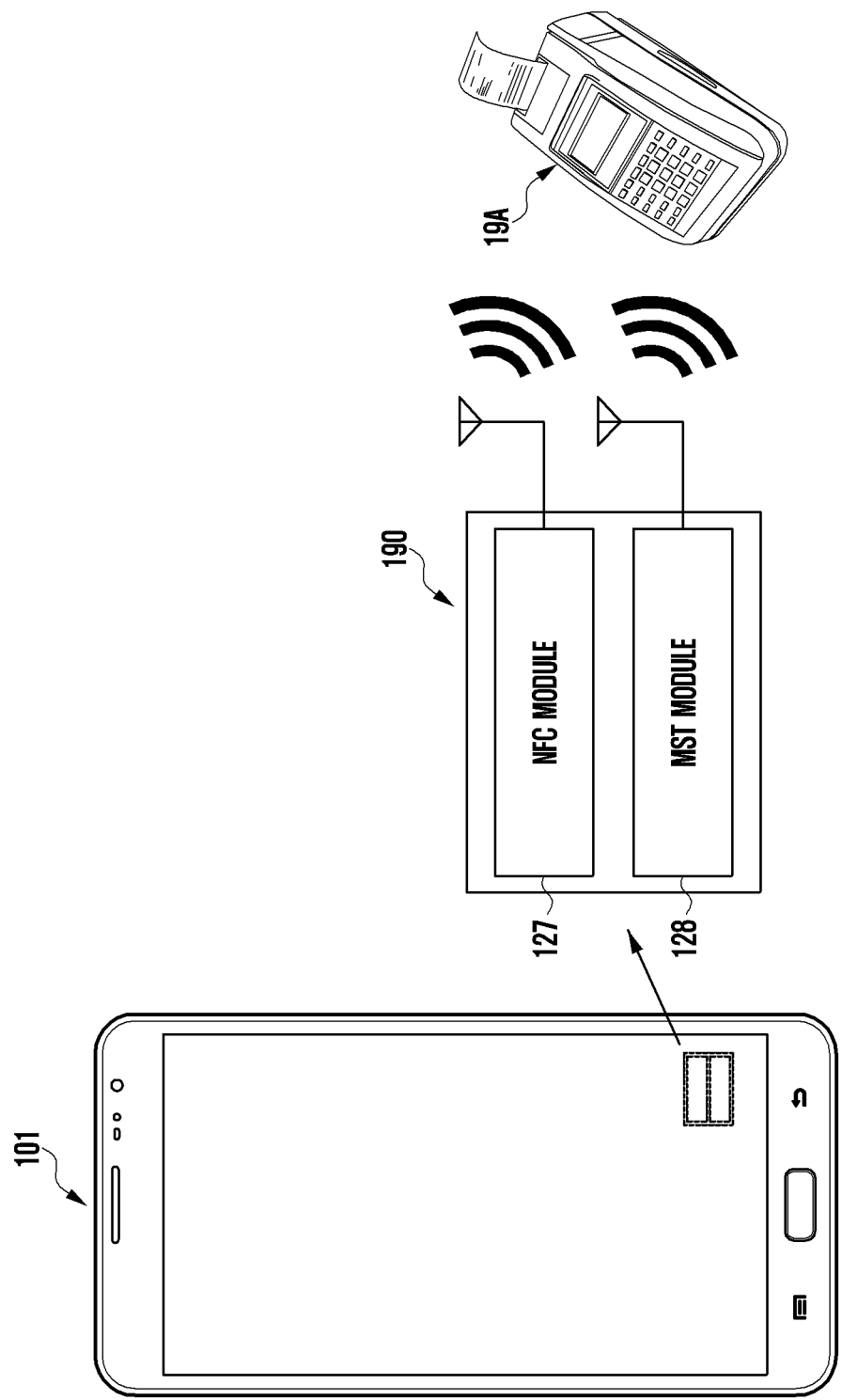
FIG. 2 is a configuration diagram of an electronic device according to an embodiment of the disclosure.

FIG. 2 is a constitution diagram of an electronic device according to an embodiment of the disclosure.

Referring to FIG. 2, an electronic device 101 may include a communication module 190 as an internal constituent element. By using the communication module 190, the electronic device 101 may transmit or receive data to or from an external device 19A, and may perform a call function, a media function, and the like.

The electronic device 101 may transmit transaction data by using the communication module 190. The transaction data may mean information stored in a storage module (e.g., the memory 130 of FIG. 1) included in the electronic device 101. The storage module may mean a storage space that is built in the electronic device 101 or is connected to the electronic device 101.

According to an embodiment of the disclosure, the transaction data generated by a data generation module may include security data or payment information. The security may be data obtained by encrypting the data stored in the storage module. The payment information may include a primary account number (PAN), a device account number (DAN), virtual credit card information, a band information number (BIN), a card security code (CSC), a card verification value (CVV), or cryptogram stored in the storage module.

In various embodiments of the disclosure, the electronic device 101 may perform a payment function for goods or service purchase by using the communication module 190. The electronic device 101 may transmit payment information to the external device 19A based on a user input. The electronic device 101 may pay costs for the good or service by transmitting the payment information. Even without a separate wallet or a credit card, a user can easily proceed with the payment by contacting or approaching the electronic device 101 to the external device 19A (e.g., the credit card reader or payment receiver).

In an embodiment of the disclosure, the electronic device 101 may provide the payment information including at least one of goods purchase or service purchase to the external device 19A. The electronic device 101 may perform an authentication process (e.g., password input or fingerprint recognition) designated in a payment process. The electronic device 101 may provide the payment information to the external device 19A by using a near field communication method (e.g., an NFC communication or MST communication), and the external device 19A may perform the payment based on the received payment information. The near field communication (NFC) communication may mean an encrypted non-contact near field communication method. The magnetic secure transmission (MST) communication may mean a method for transmitting information by copying an inherent magnetic field pattern generated from a magnetic line.

According to various embodiments of the disclosure, the communication module 190 may include one or more sub-communication modules that can perform an offline payment. The one or more sub-communication modules may include, for example, NFC modules 127 and MST modules 128.

For example, the near field communication (NFC) module 127 may support near field communication capable of performing duplex communication with respect to data in a designated frequency band (e.g., 13.56 MHz) between devices mounted with NFC chips. The NFC module 127 may operate in a manual communication mode in which a channel is formed by being supplied with a power from a magnetic field generated by the external device 19A or in an active communication mode in which a channel is formed by directly generating a magnetic field.

The NFC module 127 may operate in accordance with a predetermined NFC signal period. In case that the NFC module 127 operates in the manual communication mode, the NFC signal period may be configured to include only the manual communication section. In case that the NFC module 127 operates in the active communication mode, the NFC signal period may be configured to include the manual communication section and the active communication section.

For example, the MST module 128 may be a near field communication module that transmits data through near field magnetic data stripe transmission. The MST method may mean a method which generates pulses in accordance with transaction data and converts the pulses into a magnetic field signal. In order for the external device 19A to receive the data, a sensor (e.g., MST reader or header) included in the external device 19A may detect the converted magnetic field signal. The external device 19A may restore the data by converting the detected magnetic field signal into an electrical signal.

The MST module 128 may receive a control signal and payment information from a control circuit inside the electronic device 101. The MST module 128 may convert the payment information into a magnetic signal to be sent out. For example, the MST module 128 may generate a magnetic signal by swiping a magnetic stripe of a credit card on the external device 19A. The external device 19A may receive the magnetic field signal and the payment information corresponding to the magnetic signal from the MST module 128. In an embodiment of the disclosure, the MST module may provide the payment information to the external device 19A through a simplex communication. The NFC module 127 and the MST module 128 are merely examples of one or more sub-communication modules, but the sub-communication modules are not limited thereto, and other near field communication methods may be further included.

In an embodiment of the disclosure, the electronic device may simultaneously or sequentially transmit a plurality of magnetic field signals (e.g., NFC signal and MST signal) by using the communication module 190. The NFC module 127 and the MST module 128 may selectively send payment information to the external device 19A in accordance with a designated schedule or a signal period (e.g., 0.2 sec). Since the NFC module 127 and the MST module 128 selectively operate in the designated time section, power consumption according to signal transmission can be reduced, and duplicate payment can be prevented. Even if a user does not separately select a communication method, the electronic device 101 can proceed with the payment only by contacting or approaching the designated payment receiver.

Figure 3:
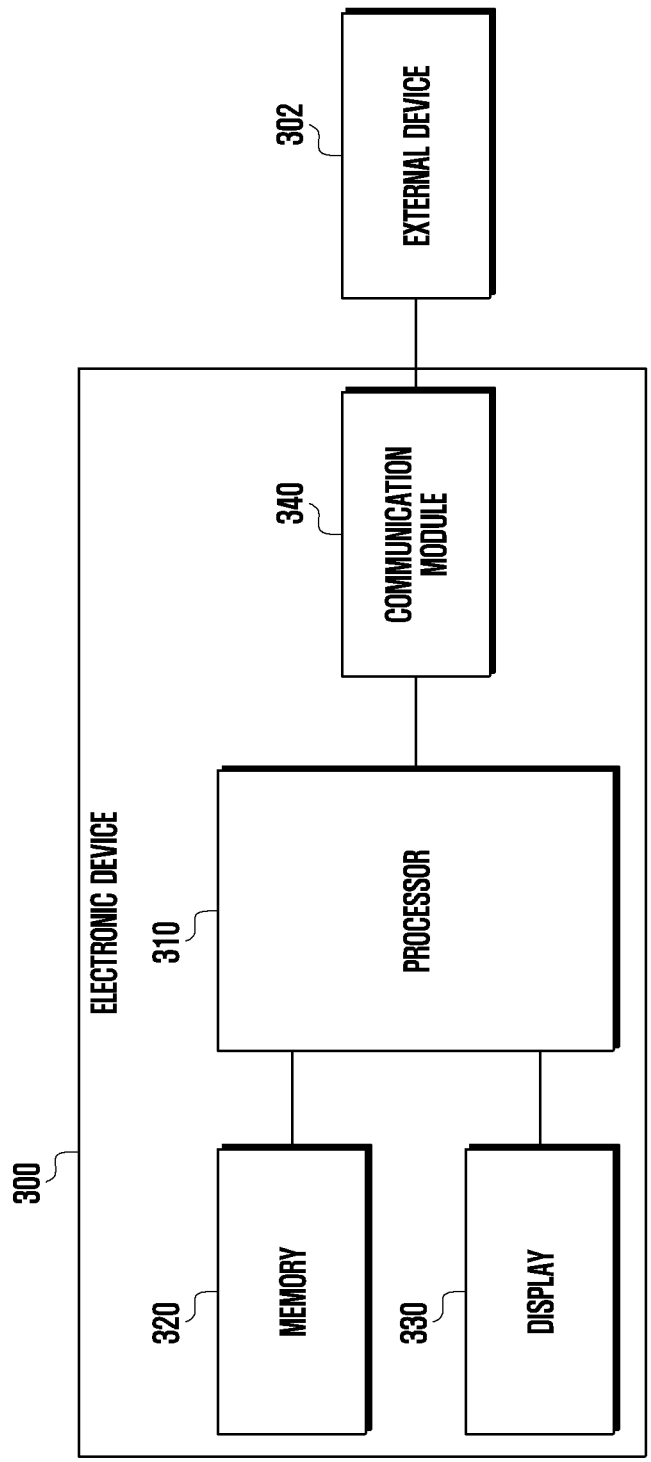
FIG. 3 is a block diagram illustrating a configuration of an electronic device according to an embodiment of the disclosure.

FIG. 3 is a block diagram illustrating a constitution of an electronic device according to an embodiment of the disclosure.

Referring to FIG. 3, according to various embodiments of the disclosure, an electronic device 300 may include a processor 310, a memory 320, a display 330, and a communication module 340, and some of the illustrated configurations may be omitted or substituted. The electronic device 300 may further include at least some of configurations and/or functions of the electronic device 101 of FIG. 1. At least some of the illustrated (or not illustrated) configurations of the electronic device 300 may be operatively, functionally, and/or electrically connected to each other.

According to various embodiments of the disclosure, the processor 310 may be a configuration that can perform an arithmetic operation or data processing related to a control and/or communication of the constituent elements of the electronic device 300, and may be including one or more processors. The processor 310 may include at least some of the configurations and/or functions of the processor 120 of FIG. 1.

According to various embodiments of the disclosure, although the arithmetic operations and data processing functions that the processor 310 can implement in the electronic device 300 may not be limited, features related to a payment process will be described below. The operations of the processor 310 may be performed by loading instructions stored in the memory 320.

According to various embodiments of the disclosure, the electronic device 300 may include one or more memories 320, and the memory 320 may include a main memory and a storage. The main memory may be including a volatile memory, such as a dynamic random access memory (DRAM), a static RAM (SRAM), or a synchronous dynamic RAM (SDRAM). Further, the memory 320 may be a non-volatile memory, and may include a large-capacity storage device. The storage may include at least one of one time programmable ROM (OTPROM), PROM, EPROM, EEPROM, mask ROM, flash ROM, flash memory, hard drive, or solid state drive (SSD). The memory 320 may store various pieces of file data, and the stored file data may be updated in accordance with the operation of the processor 310.

According to various embodiments of the disclosure, the display 330 may display various images under the control of the processor 310. The display 330 may be implemented by any one of a liquid crystal display (LCD), a light-emitting diode (LED) display, or an organic light-emitting diode (OLED) display, but the implemented display is not limited thereto. The display 330 may be formed as a touch screen that detects a touch and/or proximity touch (or hovering) by using a user's body part (e.g., a fingerprint) or an input device (e.g., a stylus pen). The display 330 may include at least some of the constitutions and/or functions of the display module 160 of FIG. 1.

According to various embodiments of the disclosure, the display 330 may be at least partly flexible, and may be implemented as a foldable display or a rollable display.

According to various embodiments of the disclosure, the communication module 330 may communicate with an external device through a wireless network under the control of the processor 310. The communication module 330 may include hardware and software modules for transmitting or receiving data from a cellular network (e.g., a long term evolution (LTE) network, 5G network, or new radio (NR) network) and a local area network (e.g., Wi-Fi or Bluetooth). The communication module 330 may include at least some of the constitutions and/or functions of the communication module 190 of FIG. 1.

The electronic device 300 may communicate with the external device 302 by using the communication module (e.g., the NFC module 127 of FIG. 2) included in the communication module 330. The electronic device 300 may receive, from the external device 302, information related to the external device 302 based on the communication.

The external device 302 may communicate with the electronic device 300 based on the communication by driving a power. According to various embodiments of the disclosure, the external device 302 may communicate with the electronic device 300 based on the manual communication module 127 that requires no power.

According to various embodiments of the disclosure, the processor 310 may display at least one image and/or text related to payment information on the display 330 in response to at least a part of a user input, determine whether to start a payment process using the electronic device 300 in response to identification of a user authentication, transmit a first signal for requesting an authentication to the external device 302 in response to identification of an approach of the external device 302 within a predetermined distance from the electronic device 300, and transmit a second signal related to the payment process by using the communication module 340 in response to identification of an authentication of the external device 302, determine whether to complete the payment process using the electronic device 300 in response to identification of a response of the external device 302 for the second signal, and transmit a third signal for indicating that the payment process has been completed to the external device 302 by using the communication module 340 in response to determination of a completion of the payment process, and control the external device to be in an untradeable state in response to a case where the response of the external device 302 for the third signal is unable to be identified within a predetermined time after the third signal is transmitted.

According to an embodiment of the disclosure, the processor 310 may output, on the display 330, information indicating existence of a transaction stored in the incomplete state in response to the identification of the storage of the data related to the payment process in the incomplete state, and output, on the display 330, transaction information stored in the incomplete state in response to the user input.

Figure 4:
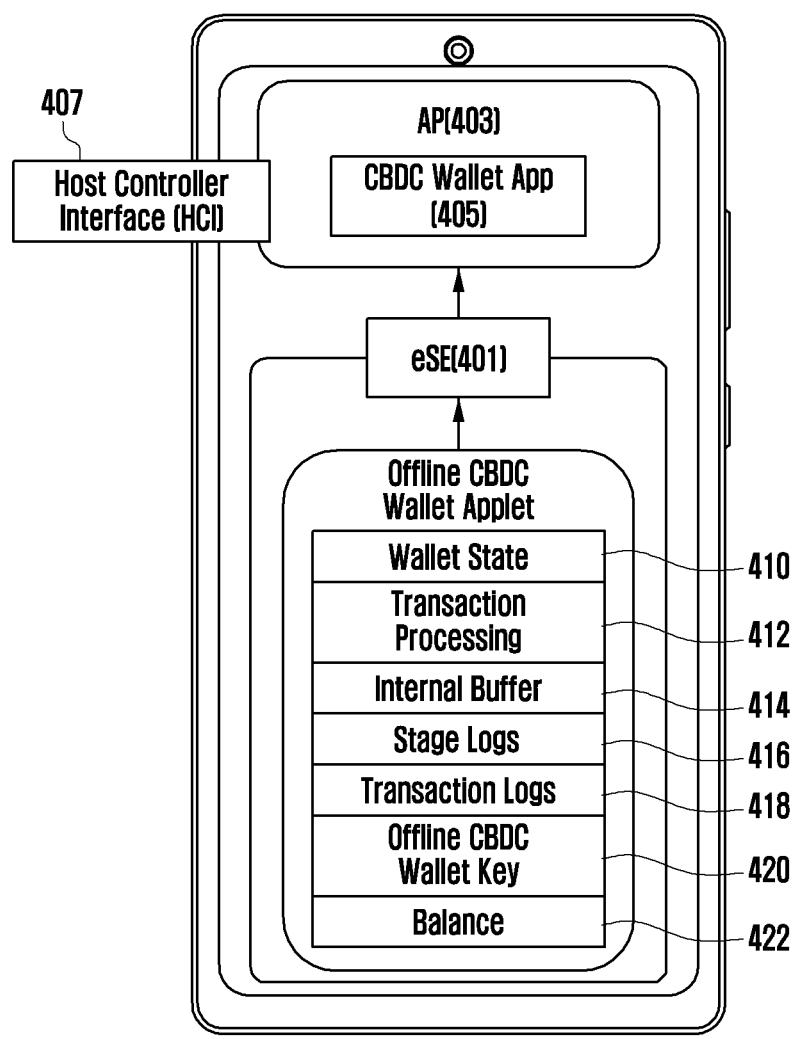
FIG. 4 illustrates an internal structure of a wallet applet of an electronic device according to an embodiment of the disclosure.

FIG. 4 illustrates a communication situation between a wallet applet and a wallet application of an electronic device according to an embodiment of the disclosure.

According to various embodiments of the disclosure, the electronic device (e.g., the electronic device 300 of FIG. 3) may include a wallet applet. The electronic device 300 may use central bank digital currency (CBDC) on offline by using the wallet applet. The central bank digital currency (CBDC) may mean the digital currency that is issued and managed by the Central bank as a means for replacing cash. Further, the electronic device 300 may include a wallet that is driven in the form of an application on a separate security processor other than in the form of an applet. The applet may mean at least one application inside an embedded secure element (eSE) 401. The applet standards may be the same regardless of media (e.g., the terminal (phone), wearable device, and IC card). However, the IC card may not include an application processor (AP) 403, and may operate by using a command that is received through the NFC module (e.g., the NFC module 127 of FIG. 2) without an operation of the application.

Referring to FIG. 4, according to an embodiment of the disclosure, the wallet applet for the offline CBDC may include at least one of wallet state 410, transaction processing 412, Internet buffer 414, stage logs 416, transaction logs 418, offline CBDC wallet key 420, and balance 422.

The electronic device 300 may manage a process state of the wallet by using the wallet state 410. For example, if there is a transaction being currently in progress, the electronic device 300 may prevent the progress of a new transaction by using the wallet state 410. The electronic device 300 may identify that the transaction being currently in progress is ended by using the wallet state 410, and may control to proceed with the new transaction. The electronic device 300 may perform the requested transaction by using the transaction processing 412. The electronic device 300 may temporarily store, in the Internet buffer 414, data that is sent or received to or from the external device (e.g., the external device 302 of FIG. 3) in the payment process, and the payment process with the external device 302 is ended, the electronic device 300 may initialize the Internet buffer 414. The electronic device 300 may store a log of the transaction being in progress on stage logs 416. The log of the transactions being in progress may include at least one of a transaction state, wallet public keys of a sender and a receiver, wallet identifiers of a sender and a receiver, transaction identifier (ID) between a sender and a receiver, signature information of a sender and a receiver, and transaction amount. The electronic device 300 can prevent double spending in a transaction situation between the sender and the receiver by using the transaction identifier (ID) between the sender and the receiver. The double spending may mean a situation where after payment of the value stored in the original file, the payment is made again to another entity through copying of the corresponding file having already been paid.

The electronic device 300 may store the log of the transaction having been completed on the transaction logs 418. The log of the completed transaction may include at least one of a transaction state, wallet public keys of a sender and a receiver, wallet identifiers of a sender and a receiver, transaction identifier (ID) between a sender and a receiver, signature information of a sender and a receiver, and balance after transaction. The electronic device 300 may send or receive a certificate to or from the external device 302 at a transaction start operation by using an offline CBDC wallet key 420. The offline CBDC wallet key 420 may include a public key and a certificate for verifying the wallet in the payment process. The electronic device 300 may store the balance of the wallet in the balance 422.

According to an embodiment of the disclosure, the application processor (AP) 403 may transfer payment information on the wallet applet to a wallet application 405. In this process, the application processor (AP) 403 may transfer an event occurring during non-contact communication (e.g., communication) to the wallet application 405 by using a host controller interface (HCI) 407.

Figure 5A:
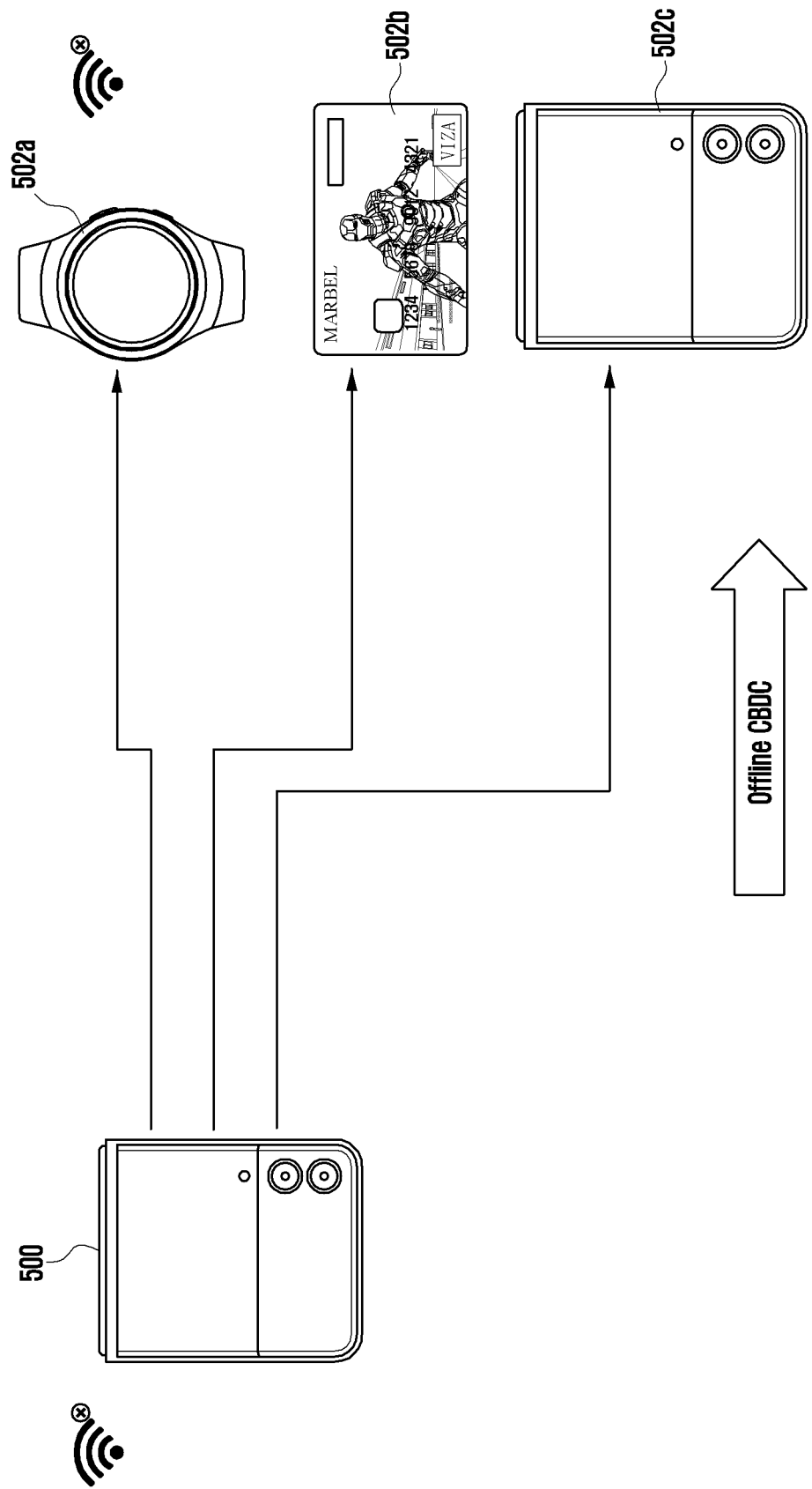
FIG. 5A illustrates an offline remittance process of an electronic device according to an embodiment of the disclosure.
Figure 5B:
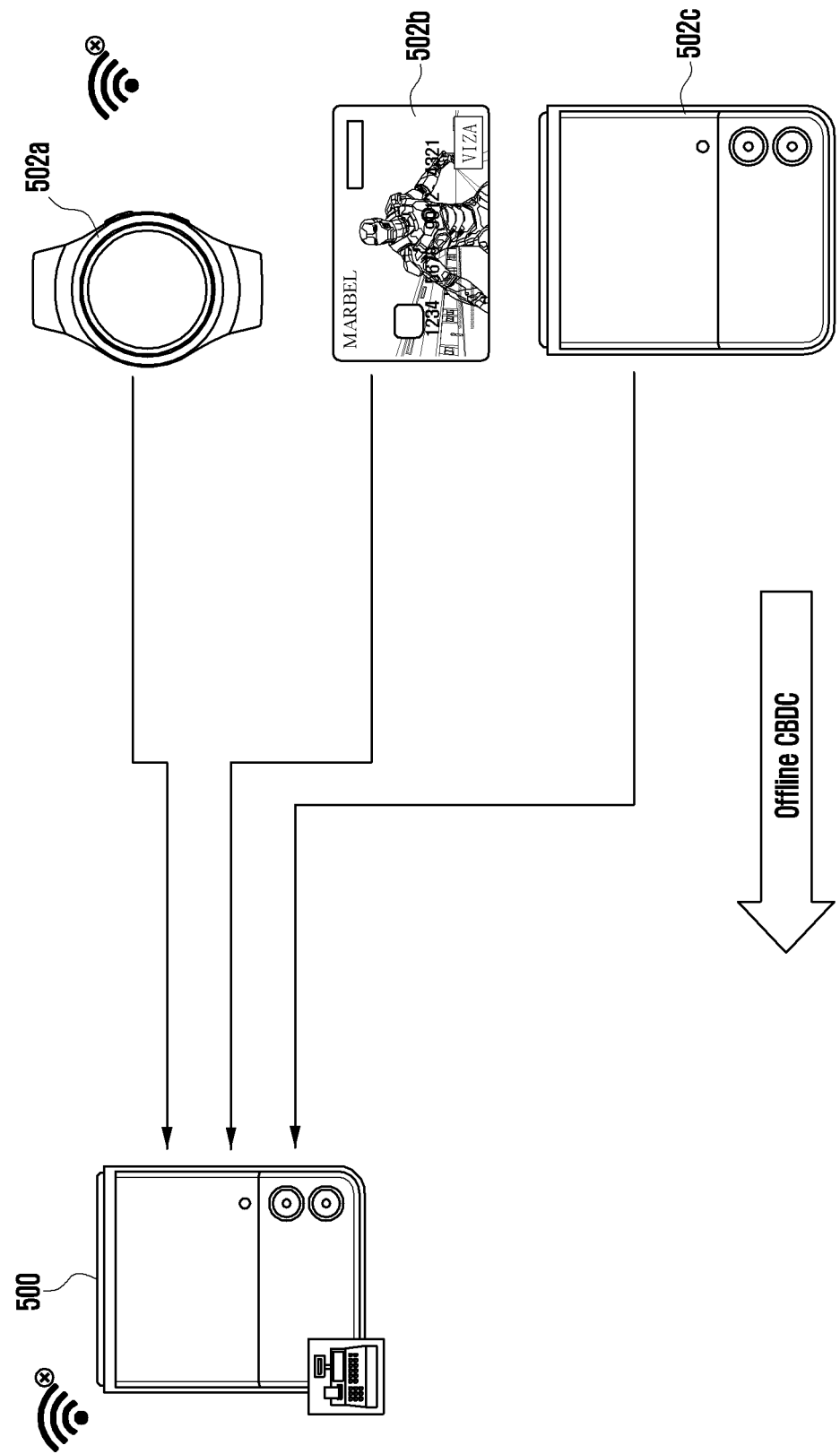
FIG. 5B illustrates an offline payment process of an electronic device according to an embodiment of the disclosure.

FIG. 5A illustrates an offline remittance process of an electronic device according to an embodiment of the disclosure. FIG. 5B illustrates an offline payment process of an electronic device according to an embodiment of the disclosure.

Referring to FIG. 5A, an electronic device 500 may include at least some of configurations and functions of the electronic device 300 of FIG. 3. The electronic device 500 may operate as a sender of money transfer in the payment process with the external device (e.g., the external device 302). For example, the external device 302 may include at least one of a shape of a wearable device 502a, a shape 502b of an IC card, and a shape 502c of a mobile terminal. The external device 302 may operate as a receiver of money collection in the payment process. In this case, the electronic device 500 may maintain in a proximity coupling device (PCD) mode or a reader mode in which it operates as a reader device. The related standards of the proximity coupling device (PCD) mode or the reader mode may include ETSI 102 622. The external device 302 may maintain in a proximity integrated circuit card (PICC) mode or a card mode in which it operates as a kind of card.

Referring to FIG. 5B, in contrast to FIG. 5A, the electronic device 500 may operate as a POS device in the payment process with the external device 302. Like the POS device, the electronic device 500 may record a payment history, and may proceed with the payment through reception of the payment information from a plurality of external devices. Referring to FIG. 5A, the electronic device 500 may be unable to carry out a new payment with another external device 302 while making one payment. For example, if it is assumed that the electronic device 500 is performing a payment with a wearable device 502a, it may be difficult for the electronic device 500 to carry out a new payment with an IC card 502b until the corresponding payment is completed. However, in case of FIG. 5B, even while proceeding with the payment with the wearable device 502a, the electronic device 500 may simultaneously proceed with the new payment with the IC card 502b, or may proceed with the new payment with another mobile terminal 502c. In this case, the electronic device 500 and another external device (e.g., the wearable device 502a, IC card 502b, or another mobile terminal 502c) may communicate with each other by using the communication module (e.g., the communication module 330 of FIG. 3). The communication type between the electronic device 500 and another external device (e.g., the wearable device 502a, IC card 502b, or another mobile terminal 502c) may include, for example, near field communication (NFC).

Figure 6A:
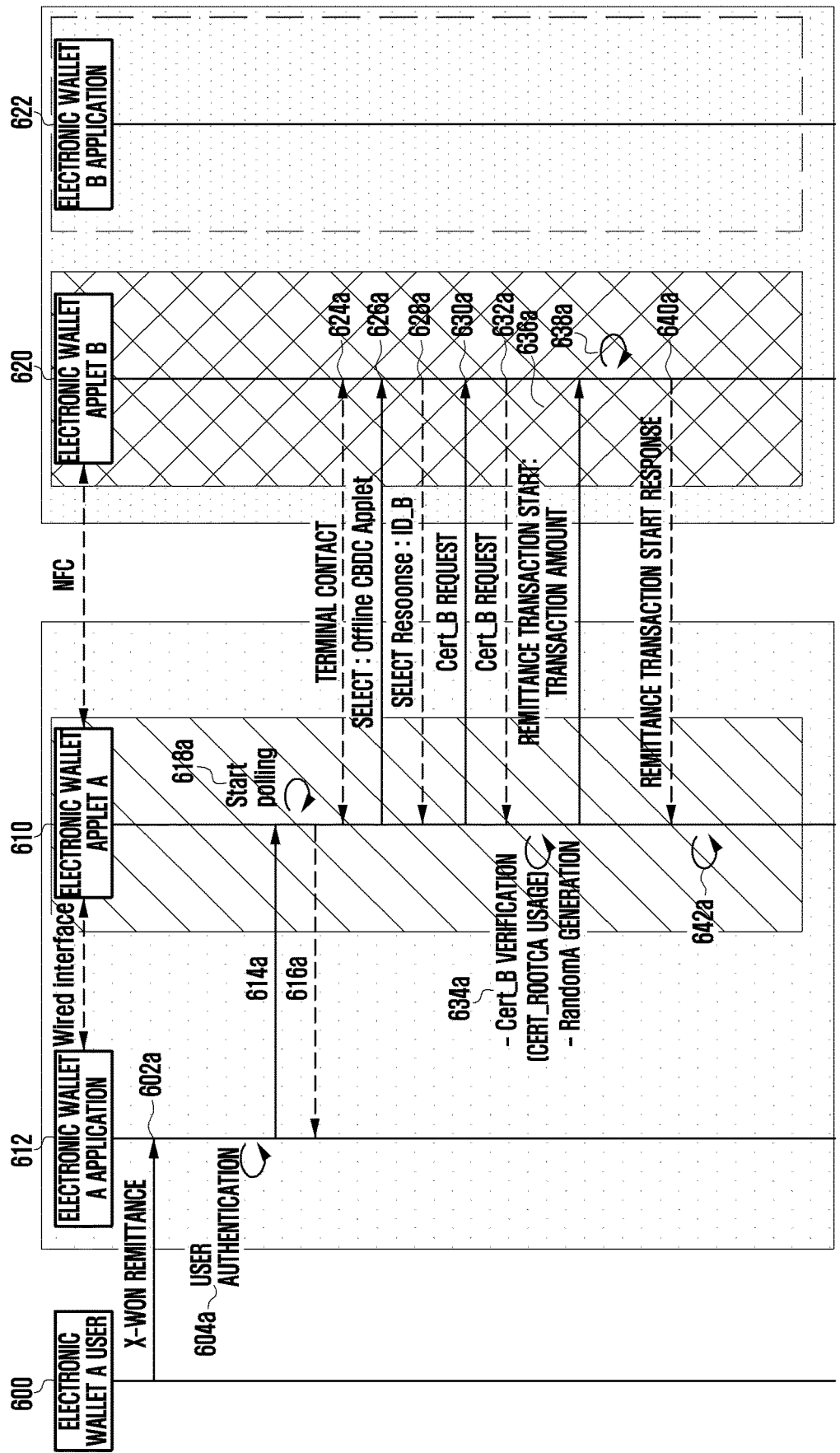
FIGS. 6A and 6B illustrate a general transaction process on offline of an electronic device according to various embodiments of the disclosure.
Figure 6B:
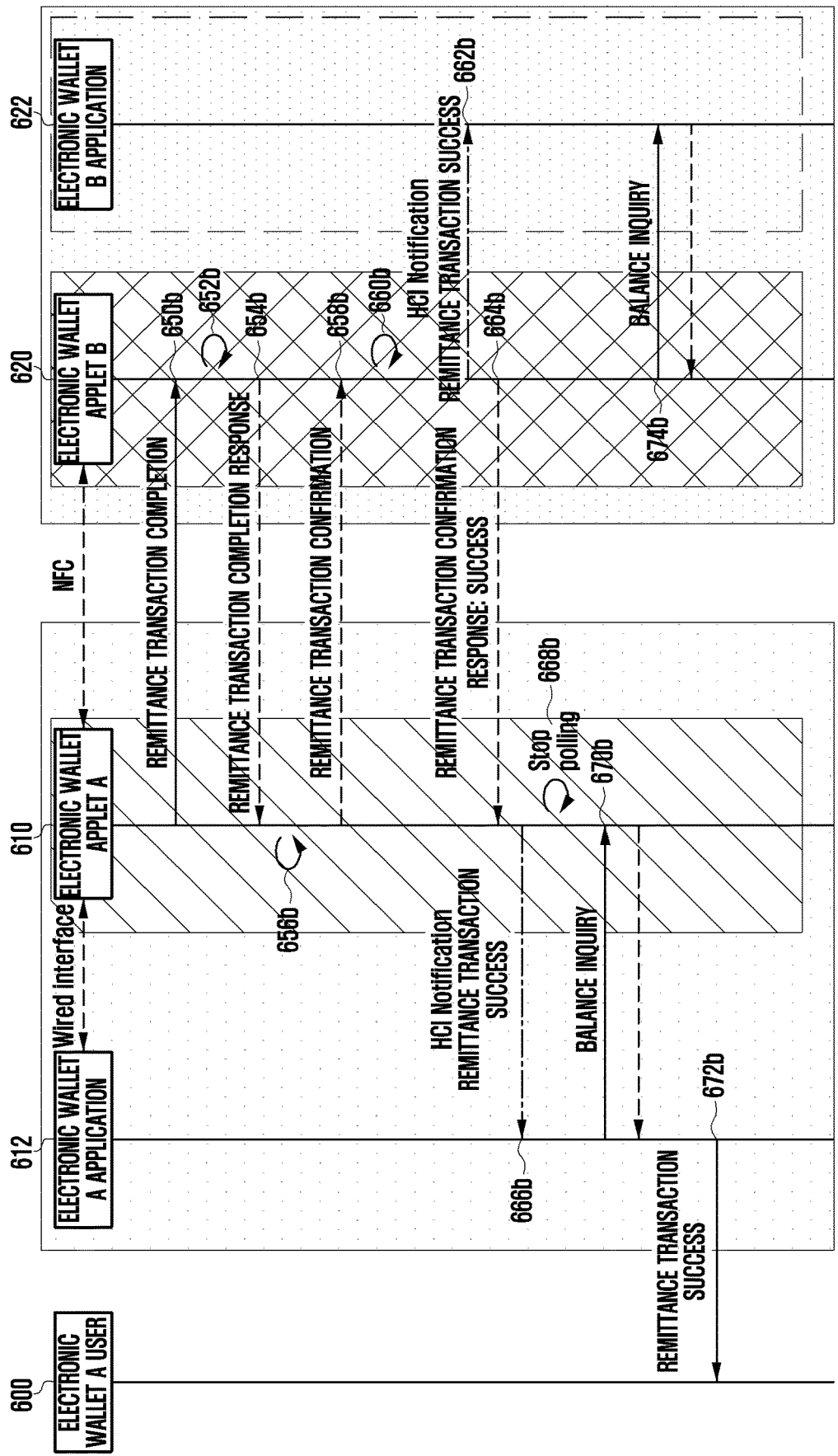

FIGS. 6A and 6B illustrate a general transaction process on offline of an electronic device according to various embodiments of the disclosure.

Referring to FIG. 6A, an application 612 of an electronic wallet A may receive a first command to remit a specific amount (e.g., x won) from a user 600 of the electronic wallet A having performed a user authentication 602a to another external device (e.g., the electronic wallet B). The first command may mean a remittance transaction start command. The application 612 of the electronic wallet A may change the electronic device (e.g., the electronic device 300 of FIG. 3) to a reader mode at operation 614a in response to the first command, and may transfer information indicating the start of the remittance transaction to an electronic wallet applet A 610 in response to an identification of the first command. The electronic wallet applet A 610 may start polling in response to identification of information indicating the start of the remittance transaction (618a). The polling may be an operation that contrasts to an interrupt. The polling may mean an operation of identifying the state of the processor at predetermined intervals. The interrupt may mean an operation of identifying the state of the processor in response to detection of a specific event. The electronic device (e.g., the electronic device 300 of FIG. 3) may search for the external device (e.g., the external device 302 of FIG. 3) to perform the transaction by using the polling operation. The electronic device 300 may transmit and/or receive data for transaction with the external device 302 having been searched for in accordance with the polling operation.

After the polling is completed, the electronic wallet applet A 610 may transmit information indicating that it is ready to operate in the reader mode on the application 612 of the electronic wallet A (616a). The electronic wallet applet A 610 may identify the contact of the electronic wallet applet B 620, and may transmit a command for selecting the electronic wallet applet B 620 to the electronic wallet applet B 620 (626a). The electronic wallet applet B 620 may receive the command for selecting the electronic wallet applet B 620, and may transmit at least one of information indicating the ID of the electronic wallet applet B 620, information indicating an applet version, and limit information to the electronic wallet applet A 610 (628a).

The electronic wallet applet A 610 may request an electronic wallet certificate (Cert_B) to the electronic wallet applet B 620 in response to the identification of the ID of the electronic wallet applet B 620 (630a), and the electronic wallet applet B 620 may transmit the electronic wallet certificate (Cert_B) to the electronic wallet applet A 610 in response to the request from the electronic wallet applet A 610 (632*a*). The electronic wallet applet A 610 may receive the electronic wallet certificate (Cert_B) from the electronic wallet applet B, and may verify the received certificate (Cert_B). If the verification of the electronic wallet certificate (Cert_B) has succeeded, the electronic wallet applet A 610 may extract a public key (PK_B) of the electronic wallet applet B 620 from the electronic wallet certificate (Cert_B) (634*a*). The electronic wallet applet A 610 may identify that the other party having sent the message is the user of the electronic wallet B by using the extracted public key (PK_B). The electronic wallet applet A 610 may verify the message including the signature of the user of the electronic wallet B by using the extracted public key (PK_B). The electronic wallet applet A 610 may generate a random byte A (random A) for transaction identification, and may transmit the same together with its own certificate (Cert_B) and the remittance transaction start command to the electronic wallet applet B 620 (636*a*).

The electronic wallet applet B 620 may verify the certificate (Cert_A) of the electronic wallet applet A 610, and may extract a public key (PK_A) of the electronic wallet applet A 610. The electronic wallet applet B 620 may generate a random byte B (random B) for transaction identification, and may generate a transaction ID (or transID) together with the received random byte A (random A). The electronic device 300 may distinguish not only the IDs of the devices that participate in the payment but also what kind of transaction is performed by using the transaction ID. For example, if there are remittance payment of 10,000 won and remittance payment of 20,000 won between the electronic devices A and B, the electronic device A may distinguish that the other party of the payment is the electronic device B, and may distinguish whether the payment is the remittance payment of 10,000 won or the remittance payment of 20,000 won as well. The transaction amount is merely exemplary, and the transaction history may be distinguished depending on not only the transaction amount but also the transaction date.

The electronic wallet applet B 620 may generate a message to be signed after defining the transaction ID, and may generate a signature message (sig_B) by signing with a secret key (SK_B) of the electronic wallet applet B 620 (638*a*). The signed message may include the contents related to at least one of transID, transaction amount, ID_A, ID_B, PK_A (or CERT_A), and PK_B (or Cert_B). The electronic wallet applet B 620 may carry out the signature message (sig_B) by using the secret key (SK_B). The electronic wallet applet A 610 may read the signature message (sig_B) by using the public key (PK_B).

Thereafter, the electronic wallet applet B 620 may transmit the signature message (sig_B) and the random byte B (random B) to the electronic wallet applet A 610 (640*a*). The electronic wallet applet A 610 may obtain the transaction ID by using the received random byte B (random B), and may generate the same signature message as that of the electronic wallet applet B 620. The electronic wallet applet A 610 may verify the signature message (sig_B) by using the generated signature message and the public key (PK_B). The electronic wallet applet A 610 may acquire information related to at least one of transID, transaction amount, ID_A, ID_B, PK_A (or CERT_A), and PK_B (or Cert_B). If the verification of the signature message (sig_B) has succeeded, the electronic wallet applet A 610 may generate the signature message (sig_A) by using its own signature key (SK_A) (642*a*). The electronic wallet applet B 620 may verify the signature message (sig_A) by using the public key (PK_A). The electronic wallet applet B 620 may identify whether the electronic wallet applet A 610 has carried out the transaction based on the result of the verification. The electronic wallet applet B 620 may confirm the transaction based on the identification in that the electronic wallet applet A 610 has carried out the transaction.

Referring to FIG. 6B, the electronic wallet applet A 610 may transmit a remittance transaction execution command including the sig_A and the transaction ID to the electronic wallet applet B 620 (650*b*). The electronic wallet applet B 620 may secure transaction related information by searching for the transaction being in progress corresponding to the received transaction ID, and may verify the received sig_A by using the PK_A. If the verification has succeeded, the wallet applet B 620 may generate a receipt signature (receiptsig_B) with the secret key SK_B by adding a tag that means the transaction completion to the previously generated signature message. Thereafter, the wallet applet B 620 may wait for x won increase of the balance as the result of the remittance transaction. Here, the x won increase waiting state of the balance may mean that the corresponding amount is expected to be reflected on the balance, but is in a state where it is unable to be used before the transaction completion command is performed. Further, the wallet applet B 620 may control not to exert an influence on the balance, or may control not to start a new transaction until the transaction is completed although it may be seen to the user that the balance is reflected (652*b*).

The electronic wallet applet B 620 may reply the receiptsig_B to the electronic wallet applet A 610 in response to the remittance transaction execution command (654*b*). The electronic wallet applet A 610 may generate the signature message in the same manner as that of the electronic wallet applet B 620, and may verify the transferred receiptsig_B by using the PK_B. The electronic wallet applet A 610 may identify whether the electronic wallet applet B 620 has completed the transaction by verifying the receiptsig_B. If the verification has succeeded, the electronic wallet applet A 610 may generate the signature receiptsig_A by using the SK_A. The signature receiptsig_A may include information indicating that the electronic wallet applet A 610 has completed the transaction and the balance of the wallet A has been reduced by x won. After reducing the balance of the wallet A by x won, and switching the transaction to a completion state, the electronic wallet applet A 610 may generate the signature receiptsig_A, and may transmit the signature receiptsign_A to the electronic wallet applet B 620 (656*b*).

The electronic wallet applet A 610 may transmit the remittance transaction completion command including the receiptsig_A and the transID to the electronic wallet applet B 620 (658*b*). The electronic wallet applet B 620 may secure the transaction related information by searching for the transaction corresponding to the transID. The electronic wallet applet B 620 may verify the signature (receiptsig_A) by using the PK_A, and if the verification has succeeded, the electronic wallet applet B 620 may confirm the x won increase of the balance of the wallet B, and may switch to the transaction completion state (660*b*).

According to an embodiment of the disclosure, if the device of the electronic wallet applet B 620 supports HCI EVT, the electronic wallet applet B 620 may transmit a remittance transaction success event to the electronic wallet B application 622, and the electronic wallet B application 622 may obtain the current balance from the electronic wallet applet B 620 by detecting the success event. The electronic wallet B application 622 may display information indicating the transaction success to the user B (662b), and may display information indicating the balance (674b).

According to an embodiment of the disclosure, the electronic wallet applet B 620 may replay whether the remittance transaction has succeeded to the electronic wallet applet A 610 in response to the remittance transaction completion command (664b). the electronic wallet applet A 610 may receive whether the remittance transaction has succeeded, may transmit the remittance transaction success event to the electronic wallet A application 612 through the HCI EVT (666b), and may stop the polling (668b), and may display information indicating the balance (670b). The application 612 of the electronic wallet A may display, to the user A, at least one of the information indicating that the remittance transaction has succeeded and the information indicating the current balance of the electronic wallet A (672b).

According to an embodiment of the disclosure, the electronic device 300 may separately manage the logs of the transaction in progress (stage log) and the completed transaction (transaction log), and in case that a new transaction or the transaction in progress is requested to proceed, the electronic device 300 may perform an operation corresponding to the transaction information being in progress. The electronic device 300 may simultaneously support the NFC reader mode and the card mode. In this case, the electronic device 300 may separately store and manage the log record of the reader stage and the log record of the card stage.

According to an embodiment of the disclosure, in the NFC card mode state, the electronic device 300 may control to manage only one transaction in progress. If a new transaction is requested in a state where there is an unexpectedly stopped transaction during the proceeding, the electronic device 300 may control to delete the corresponding transaction or to complete the existing transaction depending on the state of the transaction (to be described hereinafter). The electronic device 300 may manage several transaction lists being in progress in the NFC reader mode, and in case of the NFC contact, the electronic device 300 may control to acquire information of a card approaching within a predetermined distance based on the tagging or the electronic device 300, and to complete the transaction being in progress depending on the transaction state.

According to an embodiment of the disclosure, the electronic device 300 may manage the state of the transaction being in progress. The state of the transaction being in progress may include a first state (performed) where the transaction is in progress, a second state (finalize) where the transaction approval of both participants has been completed, and the balance increase/decrease of the wallet of either of the participants may have been completed, and a third state (completed) that is the transaction completion state. In case that the transaction is unexpectedly stopped due to NFC field out situation or power off, the electronic device 300 may identify whether the corresponding transaction is in the second state. The electronic device 300 may control to complete the transaction in response to the identification in that the transaction state is the second state, and if the transaction has not been completed, the electronic device 300 may change the transaction state to an untradeable state so that a new transaction is unable to be performed. The electronic device 300 may move the corresponding transaction history to the completed transaction log in response to the identification in that the transaction state is the third state.

Figure 6C:
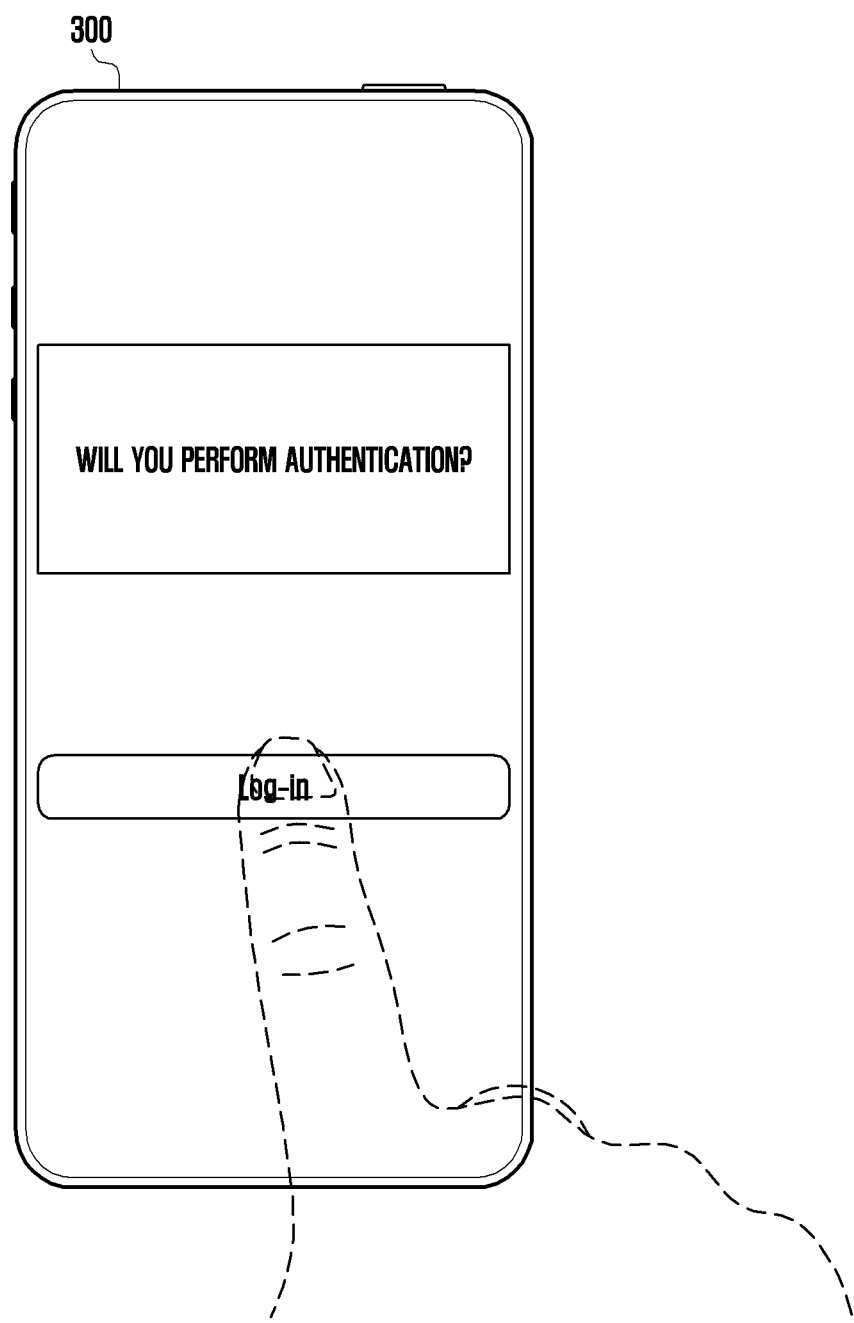
FIGS. 6C and 6D illustrate a UI that is displayed on a screen of an electronic device according to various embodiments of the disclosure.
Figure 6D:
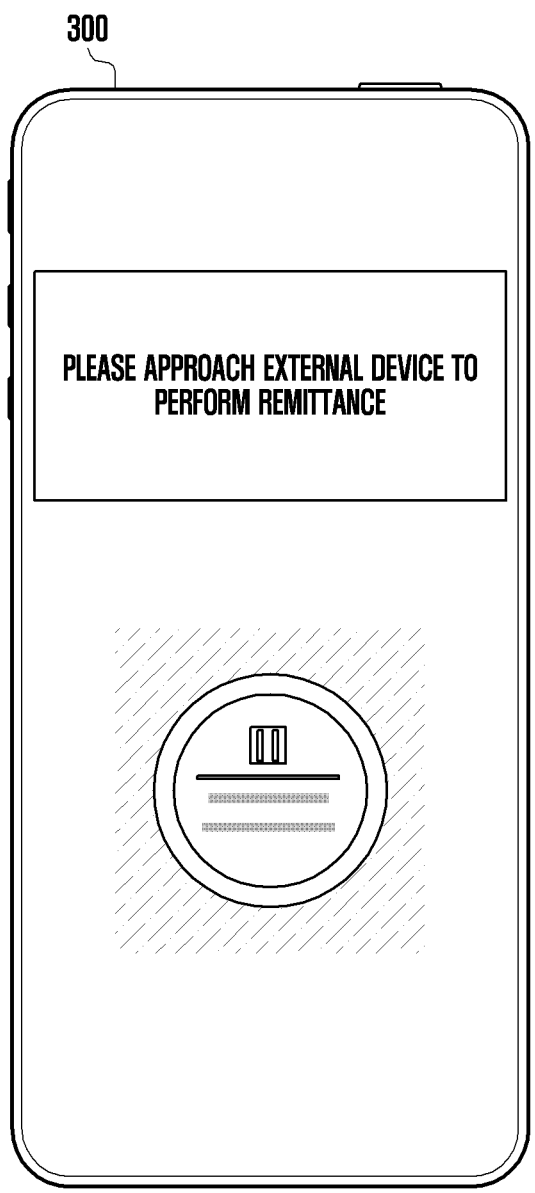

FIGS. 6C and 6D illustrate a UI that is displayed on a screen of an electronic device according to various embodiments of the disclosure.

Referring to FIG. 6C, it illustrates a screen of an electronic device 300 in an operation in which the electronic device 300 requests a user authentication at operation 604a of FIG. 6A. The electronic device 300 may display a screen for requesting a user authentication by using the display 330. The electronic device 300 may control to verify the contents of the user authentication in response to the identification of the user authentication and to proceed with the remittance when the verification is completed.

Referring to FIG. 6D, it illustrates a screen of an electronic device 300 in an operation in which the electronic device 300 requests an access of the external device 302 at operation 624a of FIG. 6A. The electronic device 300 may display a screen for requesting an access of the external device 302 by using the display 330.

Figure 6E:
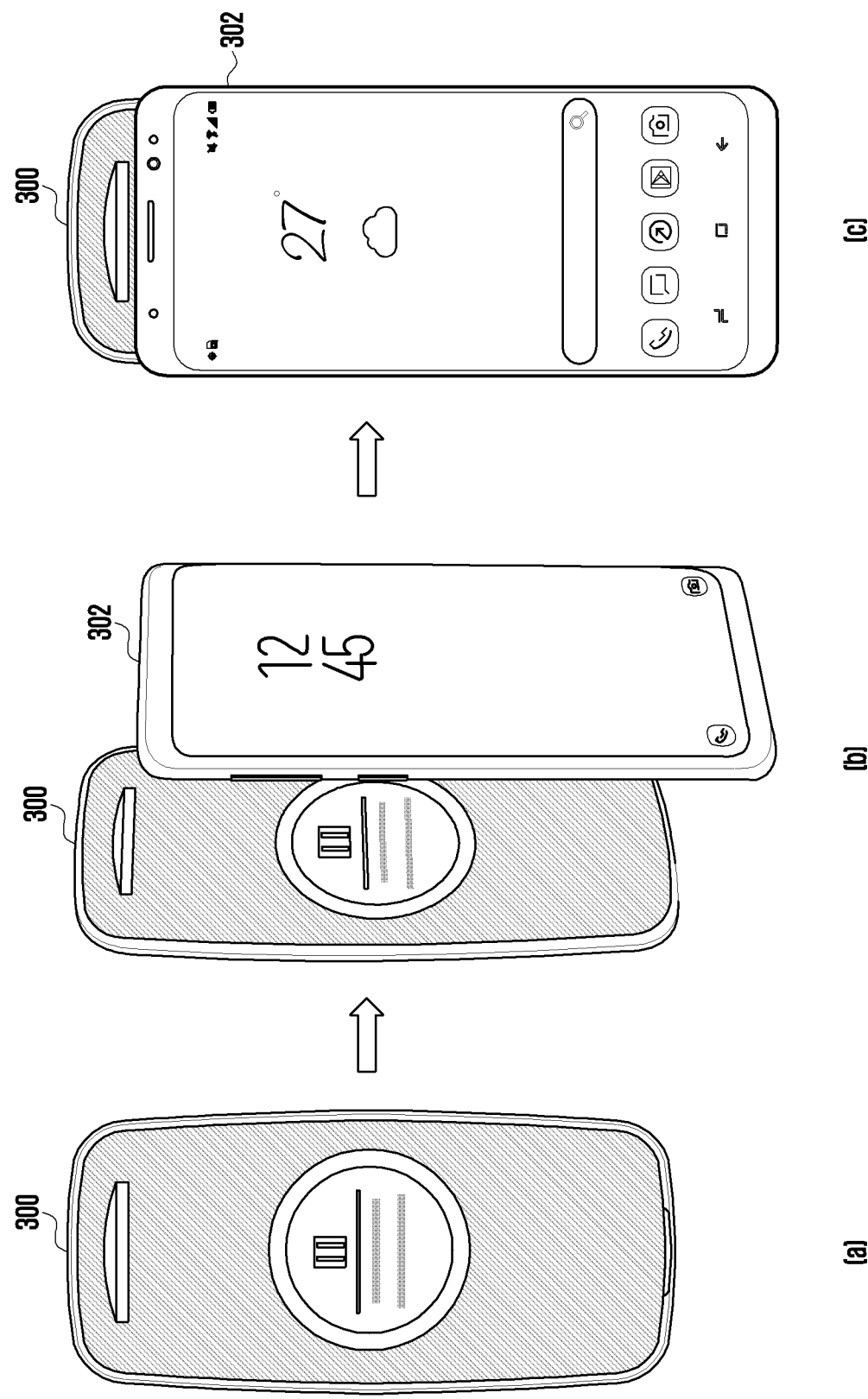
FIG. 6E is a diagram illustrating a situation where an electronic device and an external device approach each other according to an embodiment of the disclosure.

FIG. 6E is a diagram illustrating a situation where an electronic device and an external device approach each other according to an embodiment of the disclosure.

Referring to FIG. 6E, the external device (e.g., the external device 302 of FIG. 3) may be in a state where it approaches a first electronic device (e.g., the electronic device 300 of FIG. 3A). In case of approaching within a predetermined distance from the electronic device 300 or contacting the electronic device 300, the external device 302 may be connected to the electronic device 300 by using a near field communication method. With reference to FIG. 6E, although explanation will be made on the assumption that the external device 302 is a terminal, the kind of the external device 302 that can approach the electronic device 300 is not limited thereto, but may further include various types of external devices (e.g., the wearable device 502a, IC card 502b, and mobile terminal 500) of FIG. 5A.

According to various embodiments of the disclosure, the near field communication method may be the NFC, and the electronic device 300 may be an electronic device including an NFC tag. The external device 302 may be an electronic device that can read the NFC tag.

According to various embodiments of the disclosure, the external device 302 may transmit a data transmission request message to the electronic device 300 in response to the connection of the near field communication means to the electronic device 300. The electronic device 300 may transmit a response message in response to the reception of the data transmission request message.

According to various embodiments of the disclosure, the external device 302 may perform the authentication of the electronic device 300 by using the response message transmitted by the electronic device 300. The external device 302 may receive the content from an external server (not illustrated) based on the authentication result of the electronic device 300, and may provide the content to the user of the external device 302.

Figure 6F:
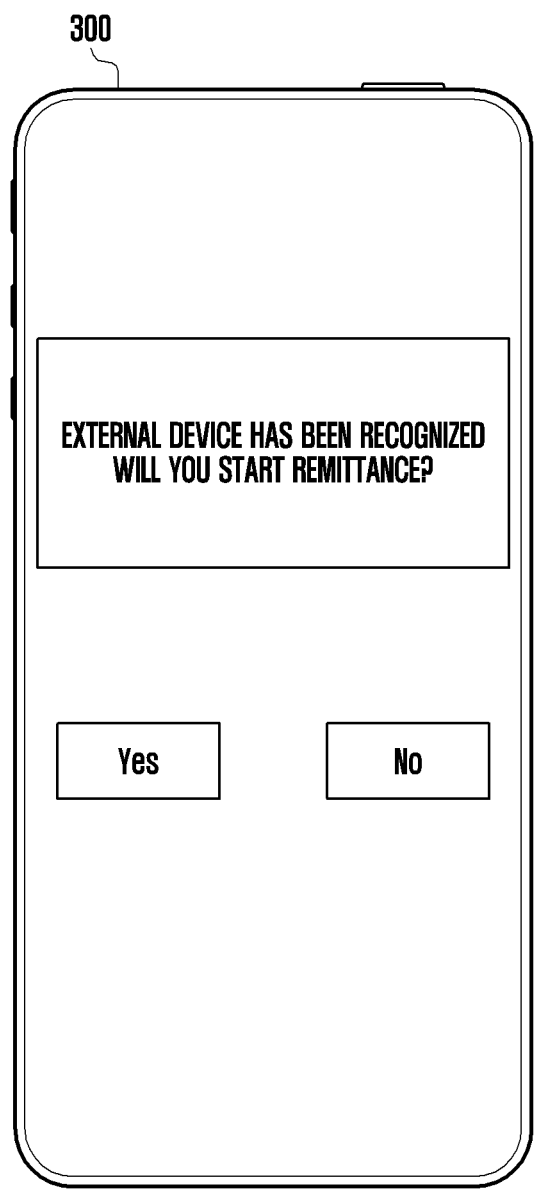
FIG. 6F illustrates a UE that is displayed on a screen of an electronic device according to an embodiment of the disclosure.

FIG. 6F illustrates a UE that is displayed on a screen of an electronic device according to an embodiment of the disclosure.

FIG. 6F illustrates a screen of an electronic device 300 in an operation in which the electronic device 300 requests a start of a remittance transaction at operation 636a of FIG. 6A. The electronic device 300 may display information indicating the start of the remittance transaction to the user by using the display 330, and may proceed with the remittance transaction in response to a user response.

FIGS. 7A, 7B, 7C, 7D, and 7E illustrate a transaction process and an error situation on offline of an electronic device according to various embodiments of the disclosure.

Figure 7A:
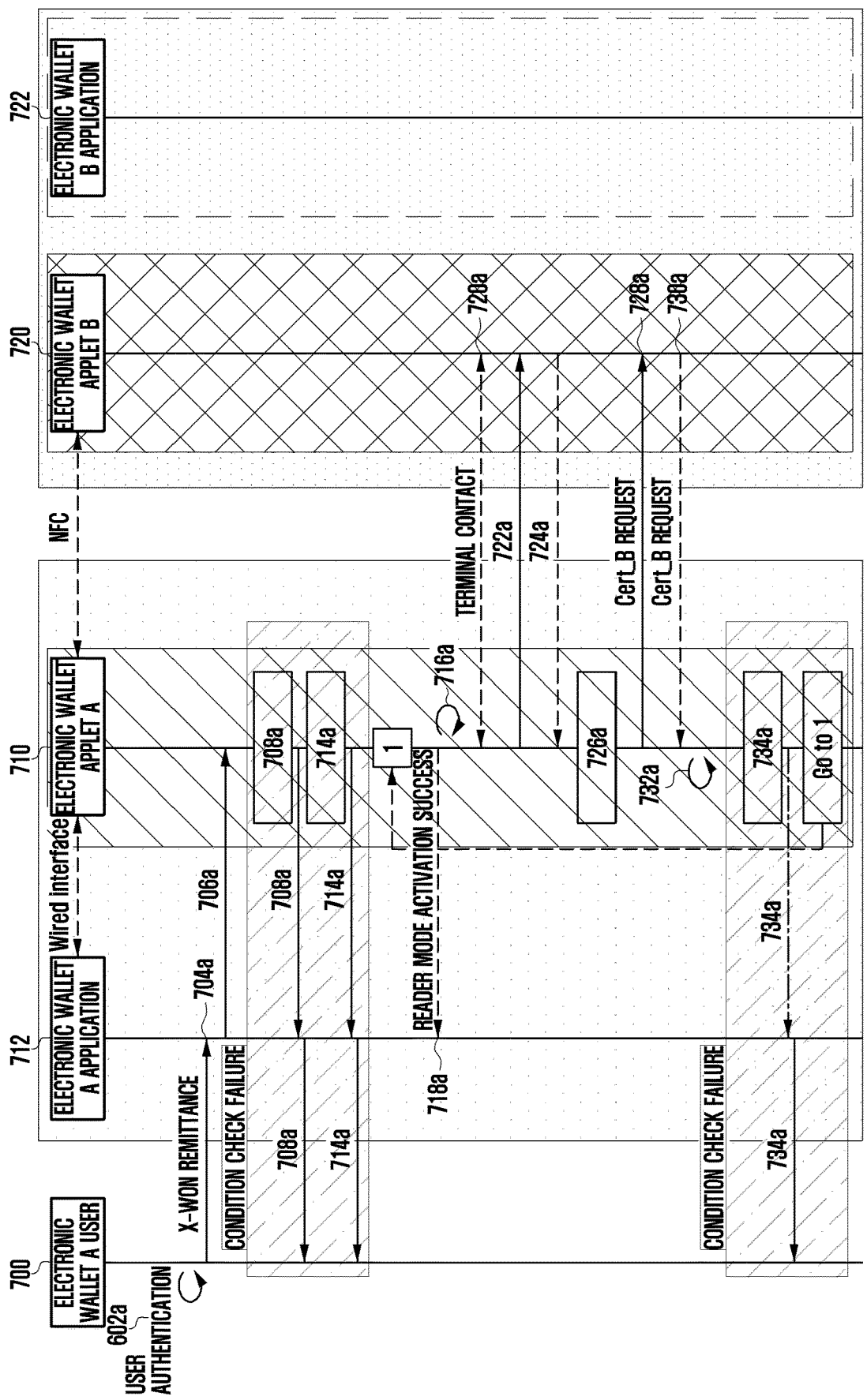

Referring to FIG. 7A, an application 712 of an electronic wallet A may receive a first command to remit a specific amount (e.g., x won) from a user 600 of the electronic wallet A having performed a user authentication 702a to another external device (e.g., the electronic wallet B). The application 712 of the electronic wallet A may change the electronic device (e.g., the electronic device 300 of FIG. 3) to a reader mode at operation 706a in response to the identification of the first command, and may transfer information indicating the start of the remittance transaction to an electronic wallet applet A 710. The electronic wallet applet A 710 may identify the balance of the electronic wallet A, and may transmit information indicating the insufficient balance to the application 712 of the electronic wallet A in response to the insufficient balance. The application 712 of the electronic wallet A may transfer the information indicating the insufficient balance to the user (708a). Further, the electronic wallet applet A 710 may transmit information indicating that the transaction is not possible to the application 712 of the electronic wallet A. The application 712 of the electronic wallet A may display, to the user, information indicating that the previous transaction is not completed and thus execution of a new transaction is not possible, and may display, to the user, information indicating to complete the previous transaction (714a).

The electronic wallet applet A 710 may start polling in response to identification of information indicating the start of the remittance transaction (716a). The electronic device 300 may search for the external device (e.g., the external device 302 of FIG. 3) to perform the transaction by using the polling operation. The electronic device 300 may transmit and/or receive data for transaction with the external device 302 having been searched for in accordance with the polling operation.

After the polling is completed, the electronic wallet applet A 710 may transmit information indicating that it is ready to operate in the reader mode on the application 712 of the electronic wallet A (718a). The electronic wallet applet A 710 may identify the contact of the electronic wallet applet B 720, and may transmit a command for selecting the electronic wallet applet B 720 to the electronic wallet applet B 720 (722a). The electronic wallet applet B 720 may receive the command for selecting the electronic wallet applet B 720, and may transmit information indicating the ID of the electronic wallet applet B 720 to the electronic wallet applet A 710 (724a).

The electronic wallet applet A 710 may identify the transaction being performed by the electronic wallet B by using information indicating the ID of the electronic wallet applet B 720, and may identify whether there is a transaction that coincides with at least one of the transaction amount, the transaction date, and the transaction subject (726a). The electronic wallet applet A 710 may request the electronic wallet certificate (Cert_B) from the electronic wallet applet B 720 in response to identification of whether there is the transaction that coincides with the at least one of the transaction amount, the transaction date, and the transaction subject (728a). The electronic wallet applet B 720 may transmit the electronic wallet certificate (Cert_B) to the electronic wallet applet A 710 in response to the request of the electronic wallet applet A 710 (730a). The electronic wallet applet A 710 may receive and verify the electronic wallet certificate (Cert_B) from the electronic wallet applet B 720.

If the verification of the electronic wallet certificate (Cert_B) has succeeded, the electronic wallet applet A 710 may extract a public key (PK_B) of the electronic wallet applet B 720. The electronic wallet applet A 710 may generate a random byte A (random A) for transaction identification (732a). If the verification of the electronic wallet certificate (Cert_B) has failed, the electronic wallet applet A 610 may transmit information indicating the certificate verification failure to the application 712 of the electronic wallet A, and the application 712 of the electronic wallet A may display, to the user, that the other party is an ineffective wallet of which the certificate verification has failed, and thus information indicating that the transaction is unable to be performed may be displayed to the user. Thereafter, the electronic device 300 may enter a mode in which it waits for an access of the external device (e.g., the external device 302 of FIG. 3) (734a). Thereafter, the electronic wallet applet A 710 may return to node 1 of FIG. 7A, and may start the polling in response to the identification of the information indicating the start of the remittance transaction (716a). Hereinafter, "Go to 1" in the drawing may mean the operation in which the electronic wallet applet A 710 returns to node 1, and may restart the polling in response to the identification of the information indicating the start of the remittance transaction.

Referring to FIG. 7B, the electronic wallet applet A 710 may transmit, to the electronic wallet applet B 720, indication information including at least one of transaction information (e.g., transaction amount of x won), random byte A (random A) for transaction identification, and remittance transaction start command (702b). The electronic wallet applet B 720 may identify whether there is a transaction being in progress between the electronic wallets A and B in response to the reception of the indication information (704b). The electronic wallet applet B 720 may identify that there is a transaction being in progress between the electronic wallets A and B, and may identify the state of the transaction being in progress. The state of the transaction being in progress may include a first state where the transaction is in progress, a second state where the transaction approval of both participants has been completed, and the balance increase/decrease of the wallet of either of the participants may have been completed, and a third state that is the transaction completion state.

The electronic wallet applet B 720 may control to proceed with a new transaction after initialization of the transaction history being in progress in response to the identification in that the state of the transaction being in progress is the first state. The electronic wallet applet B 720 may control to proceed with a new transaction may transmit, to the application 722 of the electronic wallet B, information indicating that the electronic wallet B is a untradeable card, and for a new transaction, the transaction being in progress should be completed or canceled in response to the identification in that the state of the transaction being in progress is the second state (712b). The application 722 of the electronic wallet B may display, to the user, the information indicating that the electronic wallet B is an untradeable card, and for a new transaction, the transaction being in progress should be completed or canceled.

The electronic wallet applet B 720 may transmit, to the electronic wallet applet A 710, the information indicating that the electronic wallet B is the untradeable card in response to the identification in that the state of the transaction being in progress is the second state (706b). Thereafter, the electronic wallet applet A 710 may return to node 1 of FIG. 7A, and may start the polling in response to the identification of the information indicating the start of the remittance transaction. The electronic wallet applet A 710 may transmit the information indicating that the electronic wallet B is the untradeable card to the application 712 of the electronic wallet A (708b). The application 712 of the electronic wallet A may display, to the user, the information indicating that the electronic wallet B is a untradeable card, and for a new transaction, the transaction being in progress by the electronic wallet B should be completed or canceled. The electronic device 300 may enter a mode in which it waits for an access of the external device (e.g., the external device 302 of FIG. 3) (710b).

According to an embodiment of the disclosure, it may be difficult for the electronic wallet B to proceed with the transaction due to an excess of the holding limit. In this case, the electronic wallet applet B 720 may transmit, to the application 722 of the electronic wallet B, information indicating that the electronic wallet B is the untradeable card due to the excess of the holding limit (714b) (720b). The electronic wallet applet A 710 may transmit the information indicating that the electronic wallet B is the untradeable card to the application 712 of the electronic wallet A (716b). The application 712 of the electronic wallet A may display the information indicating that the electronic wallet B is the untradeable card to the user. The electronic device 300 may enter a mode in which it waits for an access of the external device (e.g., the external device 302 of FIG. 3) (718b).

According to an embodiment of the disclosure, it may be difficult for the electronic wallet B to proceed with the transaction due to a failure of certificate verification of the electronic wallet A. In this case, the electronic wallet applet B 720 may transmit, to the application 722 of the electronic wallet B, information indicating that the electronic wallet A is the untradeable card due to the failure of the certificate verification (726b). The electronic wallet applet B 720 may transmit the information indicating that the electronic wallet A is the untradeable card due to the failure of the certificate verification to the electronic wallet applet A 710 (722b). The electronic wallet applet A 710 may return to node 1 of FIG. 7A, and may start the polling in response to the identification of the information indicating the start of the remittance transaction. The electronic wallet applet A 710 may transmit the information indicating that the transaction has been rejected due to the verification failure of the certificate (Cert_A) to the application 712 of the electronic wallet A (724b). The application 712 of the electronic wallet A may display, to the user, the information indicating that the transaction has failed due to an unexpected error occurrence caused by the verification failure of the certificate (Cert_A). The electronic device 300 may enter a mode in which it waits for an access of the external device (e.g., the external device 302 of FIG. 3) (730b).

Referring to FIG. 7C, the electronic wallet applet B 720 may generate a message to be signed after defining the transaction ID, and may generate a signature message (sig_B) by signing with a secret key (SK_B) of the electronic wallet applet B 720. The signed message may include the contents related to at least one of transID, transaction amount, ID_A, ID_B, PK_A (or CERT_A), and PK_B (or Cert_B).

The electronic wallet applet A 710 may receive the random byte B (random B) for transaction identification and the signature message (sig_B) from the electronic wallet applet B 720 (702c). The electronic wallet applet A 710 may identify that the communication (e.g., an NFC session) has been ended before receiving the random byte B (random B) for the transaction identification and the signature message (sig_B) from the electronic wallet applet B 720 after the remittance transaction start command is transmitted. In this case, the electronic wallet applet A 710 may return to node 1 of FIG. 7A, and may start the polling in response to the identification of the information indicating the start of the remittance transaction. If the communication (e.g., an NFC session) is stopped during the transaction, the electronic wallet applet A 710 may transmit the information indicating that the communication has been stopped to the application 712 of the electronic wallet A (704c). The application 712 of the electronic wallet A may display, to the user, the information indicating that the transaction has been stopped due to the communication stop. Thereafter, the electronic device 300 may enter a mode in which it waits for an access of the external device (e.g., the external device 302 of FIG. 3) (706c).

The electronic wallet applet A 710 may receive the random byte B (random B) for transaction identification and the signature message (sig_B) from the electronic wallet applet B 720 (702c). The electronic wallet applet A 710 may obtain the transID by using the received random byte B (random B), and may verify the signature message (sig_B) by using the public key (PK_B) (708c). If the verification has failed, the electronic wallet applet A 710 may transmit the information indicating that the signature verification of the electronic wallet B has failed to the application 712 of the electronic wallet A (714c). In this case, the electronic wallet applet A 710 may return to node 1 of FIG. 7A, and may start the polling in response to the identification of the information indicating the start of the remittance transaction. The application 712 of the electronic wallet A may display, to the user, the information indicating that the transaction has been stopped due to the failure of the signature verification of the electronic wallet B. Thereafter, the electronic device 300 may enter a mode in which it waits for an access of the external device (e.g., the external device 302 of FIG. 3) (716c).

If the verification has succeeded, the electronic wallet applet A 710 may generate the signature message (sig_A) by using its own signature key (SK_A)*720c). The electronic wallet applet A 710 may transmit the remittance transaction execution command including the sig_A and the transID to the electronic wallet applet B 720 (722c). The electronic wallet applet B 720 may secure transaction related information by searching for the transaction corresponding to the received transID, and may verify the received sig_A by using the PK_A. If the transaction being in progress corresponding to the received transID does not exist, or if the transaction is not possible due to the excess of the holding limit of the electronic wallet B, the electronic wallet applet B 720 may transmit, to the electronic wallet applet A 710, information indicating that the transaction has failed due to condition dissatisfaction of the electronic wallet B (724c). The electronic wallet applet A 710 may delete the corresponding transaction record in response to the reception of the information indicating that the transaction has failed due to the condition dissatisfaction of the electronic wallet B (726c). In this case, the electronic wallet applet A 710 may return to node 1 of FIG. 7A, identify the information indicating the start of the remittance transaction, and start the polling. The electronic wallet applet A 710 may transmit the information indicating that the transaction has been ended due to a condition check failure of the electronic wallet B to the application 712 of the electronic wallet A (728c). The application 712 of the electronic wallet A may display, to the user, the information indicating that the transaction has been stopped due to the condition check failure of the electronic wallet B. Thereafter, the electronic device 300 may enter a mode in which it waits for an access of the external device (e.g., the external device 302 of FIG. 3) (730c).

Figure 7D:
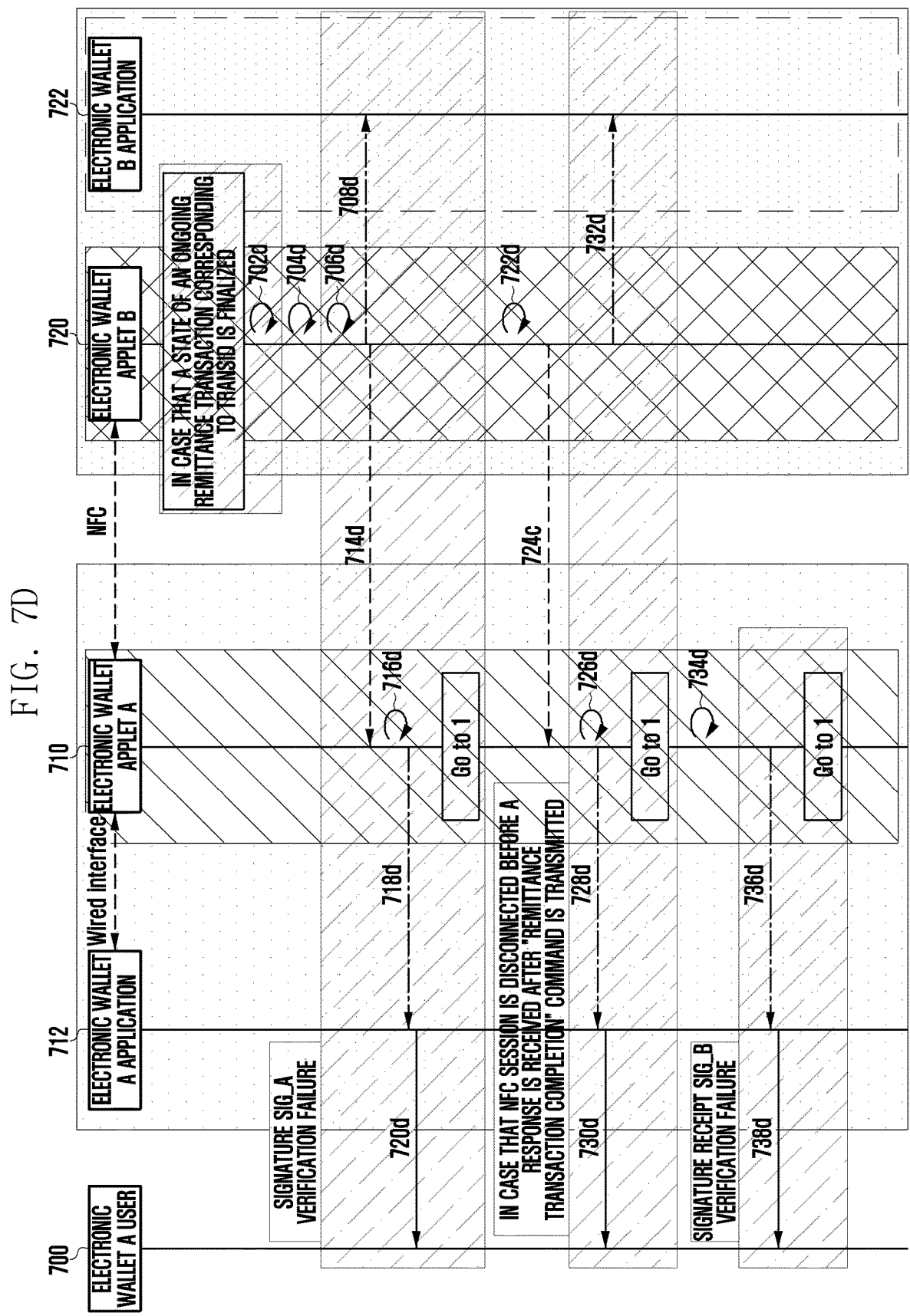

Referring to FIG. 7D, the electronic wallet applet B 720 may switch the state of the corresponding transaction to the first state in response to the identification in that the state of the transaction corresponding to the transaction ID is the second state (702d). The first state may mean the state where the transaction is in progress, and the second state may mean a state where the transaction approval of both participants has been completed, and the balance increase/decrease of the wallet of either of the participants may have been completed. The electronic wallet applet B 720 may verify the signature message (sig_A) by using the public key (PK_A) after switching the state of the transaction corresponding to the transaction ID to the first state (704d). The electronic wallet applet B 720 may delete the corresponding transaction history in response to the failure of the verification of the signature message (sig_A) (706d), and may transmit the information indicating that the verification of the signature message (sig_A) has failed to the application 722 of the electronic wallet B (708d). The electronic wallet applet B 720 may transmit the information indicating that the transaction of the electronic wallet A is not possible due to the verification failure of the signature message (sig_A) to the electronic wallet applet A 710 (714d). The electronic wallet applet A 710 may delete the corresponding transaction history (716d), may return to node 1 of FIG. 7A, may identify the information indicating the start of the remittance transaction, and may start the polling. The electronic wallet applet B 720 may transmit the information indicating that the transaction has been rejected due to the verification failure of the signature message (sig_A) to the application 712 of the electronic wallet A (718d). The application 712 of the electronic wallet A may display, to the user, the information indicating that the transaction has failed due to an unexpected error occurrence caused by the verification failure of the signature message (sig_A). The electronic device 300 may enter a mode in which it waits for an access of the external device 302 (720d).

The electronic wallet applet B 720 may secure the transaction related information by searching for the transaction being in progress corresponding to the received transaction ID, and may verify the received sig_A by using the PK_A. If the verification has succeeded, the wallet applet B 720 may generate a signature (receiptsig_B) with the secret key SK_B by adding a tag that means the transaction completion to the previously generated signature message. Thereafter, the wallet applet B 720 may wait for x won increase of the balance as the result of the remittance transaction. Here, the x won increase waiting state of the balance may mean that the corresponding amount is expected to be immediately reflected on the balance, but is in a state where it is unable to be used before the transaction completion command is performed. The electronic wallet applet B 720 may store the transaction state as the second state (722d). The electronic wallet applet B 720 may replay the receiptsig_B to the electronic wallet applet A 710 in response to the remittance transaction execution command (724d).

The electronic wallet applet A 710 may generate the signature message in the same manner as that of the electronic wallet applet B 720, and may verify the transferred receiptsig_B by using the PK_B. If the verification has succeeded, the electronic wallet applet A 710 may generate the receipt signature receiptsig_A by using the SK_A. If these processes have been completed in all, the electronic wallet applet A 710 may switch the transaction to a completion state through reduction of the balance of the wallet A by x won. The electronic wallet applet A 710 may transmit the remittance transaction completion command including the receiptsign_A and the transID to the electronic wallet applet B 720.

The electronic wallet applet A 710 may confirm that the communication with the external device 302 is ended in a response waiting state after transmitting the remittance transaction completion command including the receiptsig_A and the transID to the electronic wallet applet B 720, and may add the corresponding transaction information to a blacklist (726d). In this case, the electronic wallet applet A 710 may return to node 1 of FIG. 7A, identify information indicating the start of the remittance transaction, and start the polling. If the communication with the application 712 of the electronic wallet A is stopped, and thus the transaction is stopped, the electronic wallet applet A 710 may transmit information indicating reattempt of the communication (728d). The application 712 of the electronic wallet A may display, to the user, the information indicating that the transaction is stopped due to the stopping of the communication, and the communication is to be reattempted, and may display, to the user, information requesting again an access of the external device (e.g., the external device 302 of FIG. 3). Thereafter, the electronic device 300 may enter a mode in which it waits for the access of the external device (e.g., the external device 302 of FIG. 3) (730d). The electronic wallet applet B 720 may transmit, to the application 722 of the electronic wallet B, the information indicating that the transaction is stopped due to the stopping of the communication and the communication is to be reattempted (734d).

The electronic wallet applet A 710 may transmit the remittance transaction completion command including the receiptsig_A and the transID to the electronic wallet applet B 720. The electronic wallet applet B 720 may secure the transaction related information by searching for the transaction corresponding to the transID. The electronic wallet applet B 720 may verify the signature (receiptsig_A) by using the PK_A, and if the verification has succeeded, the electronic wallet applet B 720 may confirm the x won increase of the balance of the wallet B, and may switch to the transaction completion state (660b). If the verification has succeeded, the wallet applet B 720 may generate a receipt signature (receiptsig_B) with the secret key SK_B by adding a tag that means the transaction completion to the previously generated signature message. Thereafter, the wallet applet B 720 may wait for x won increase of the balance as the result of the remittance transaction. Here, the x won increase waiting state of the balance may mean that the corresponding amount is expected to be immediately reflected on the balance, but is in a state where it is unable to be used before the transaction completion command is performed. The electronic wallet applet B 720 may store the transaction state as the third state. The electronic wallet applet B 720 may reply the receiptsig_B to the electronic wallet applet A 710 in response to the remittance transaction execution command.

According to an embodiment of the disclosure, the electronic wallet applet A 710 may transmit, to the application 712 of the electronic wallet A, the information indicating that the verification of the receiptsig_B has failed and it is necessary to reattempt the authentication for the transaction completion (736d). If the unexpected error has occurred due to the failure of the verification of the receiptsig_B and the verification has not been completed, the application 712 of the electronic wallet A may display, to the user, the information indicating that the transaction state may be the untradeable state in case that the verification is not completed. Further, the application 712 of the electronic wallet A may display, to the user, the information indicating that it is necessary to access the external device 302 again in order to complete the transaction. Thereafter, the electronic device 300 may enter the mode in which it waits for the access of the external device (e.g., the external device 302 of FIG. 3) (738*d*). In this case, the electronic wallet applet A 710 may return to node 1 of FIG. 7A, identify information indicating the start of the remittance transaction, and start the polling.

According to an embodiment of the disclosure, the electronic wallet applet A 710 may cancel the transaction in response to the failure of the verification of the receiptsig_B, and may transmit, to the electronic wallet applet B 720, the transaction cancellation command indicating that the transaction has failed and the transaction has finally canceled.

Referring to FIG. 7E, the electronic wallet applet A 710 may generate a receipt signature (receiptsig_A) with the SK_A, and may reduce the balance by x won. If the transID is present in the blacklist, the electronic device 300 may delete the transID from the blacklist, and may process the same as the transaction completion (702*e*). Thereafter, the electronic wallet applet A 710 may transmit the transaction ID and the receipt signature (receiptsig_A) to the electronic wallet applet B 720 (704*e*). The electronic wallet applet B 720 may verify the receipt signature (receiptsig_A) by using the public key (PK_A) (706*e*). In (706*e*), the electronic wallet applet B 720 may transmit the information indicating that the verification of the receipt signature (receiptsig_A) has failed and the transaction has not been completed to the electronic wallet applet A 710 (714*e*). The electronic wallet applet A 710 may newly generate a receipt signature (receiptsig_A) in response to the reception of the information indicating that the verification of the receipt signature (receiptsig_A) has failed and the transaction has not been completed (716*e*). The electronic wallet applet A 710 may transmit, to the application 712 of the electronic wallet A, the information indicating that the verification of the receipt signature (receiptsig_A) has failed and the transaction has not been completed (718*e*). The electronic wallet applet A 710 may transmit the newly generated receipt signature (receiptsig_A) to the electronic wallet applet B 720 (720*e*). The electronic wallet applet B 720 may verify again the newly generated receipt signature (receiptsig_A). If the verification of the receipt signature (receiptsig_A) has succeeded, the electronic wallet applet B 720 may confirm the increase of the balance, delete the transaction progress information after the transaction completion, and separately classify and store the completed information (722*e*). The electronic wallet applet B 720 may transmit the information indicating that the transaction has been completed to the application 722 of the electronic wallet B (726*e*). The electronic wallet applet B 720 may transmit the information indicating that the transaction has been completed to the electronic wallet A 710 (724*e*).

According to an embodiment of the disclosure, the electronic wallet applet A 710 may identify that the communication has been ended before receiving the information indicating that the transaction has been completed from the electronic wallet applet B 720. In this case, the electronic wallet applet A 710 may stop the polling (732*e*), and may transmit information indicating that the communication has been ended and the communication connection is attempted again to the application 712 of the electronic wallet A (734*e*). The application 712 of the electronic wallet A may display, to the user, the information indicating that the communication has been ended and the communication connection is to be attempted again. The electronic wallet applet B 720 may transmit the information indicating that the communication has been ended and the communication connection is to be attempted again to the application 722 of the electronic wallet B (728*e*). Thereafter, if the transaction is completed, the electronic wallet applet B 720 may transmit, to the application 722 of the electronic wallet B, information indicating the transaction completion and information related to the balance of the electronic wallet B in response to the balance enquiry request received from the application 722 of the electronic wallet B (730*e*).

According to an embodiment of the disclosure, the electronic wallet applet A 710 may receive the information indicating that the transaction has been completed from the electronic wallet applet B 720, and may stop the polling (738*e*). Thereafter, the electronic wallet applet A 710 may transmit the information indicating that the transaction has been completed to the application 712 of the electronic wallet A (740*e*). The electronic wallet applet A 710 may receive information for requesting confirmation of the balance from the application 712 of the electronic wallet A, and corresponding to this, may transmit information related to the balance of the electronic wallet A to the application 712 of the electronic wallet A (742*e*). The application 712 of the electronic wallet A may display, to the user, the information indicating that the transaction has been completed and the information related to the balance of the electronic wallet A (744*e*).

Figure 8A:
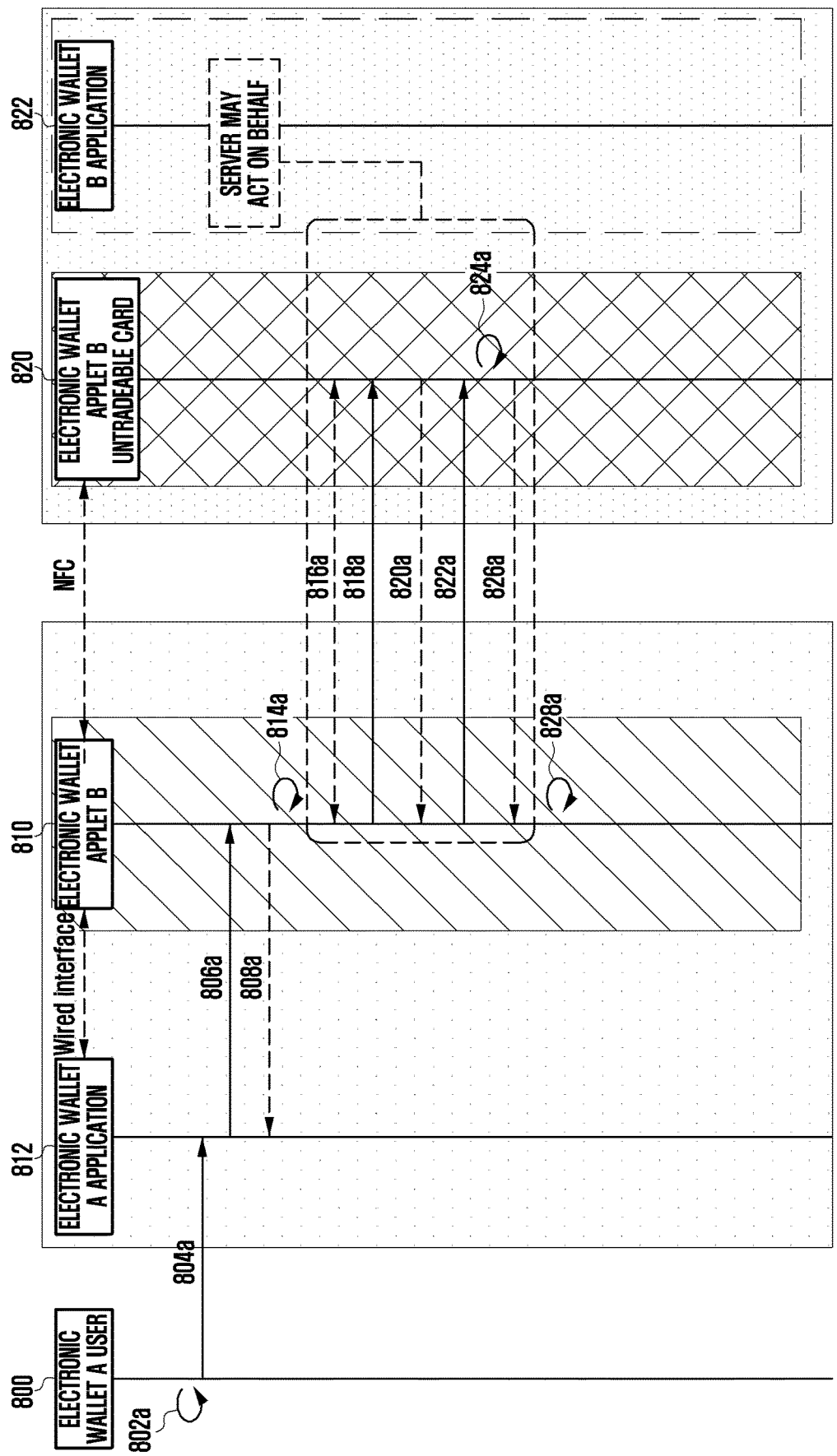
FIGS. 8A and 8B illustrate a process of reconfirming a payment when a payment is stopped due to an error situation of an electronic device according to various embodiments of the disclosure.
Figure 8B:
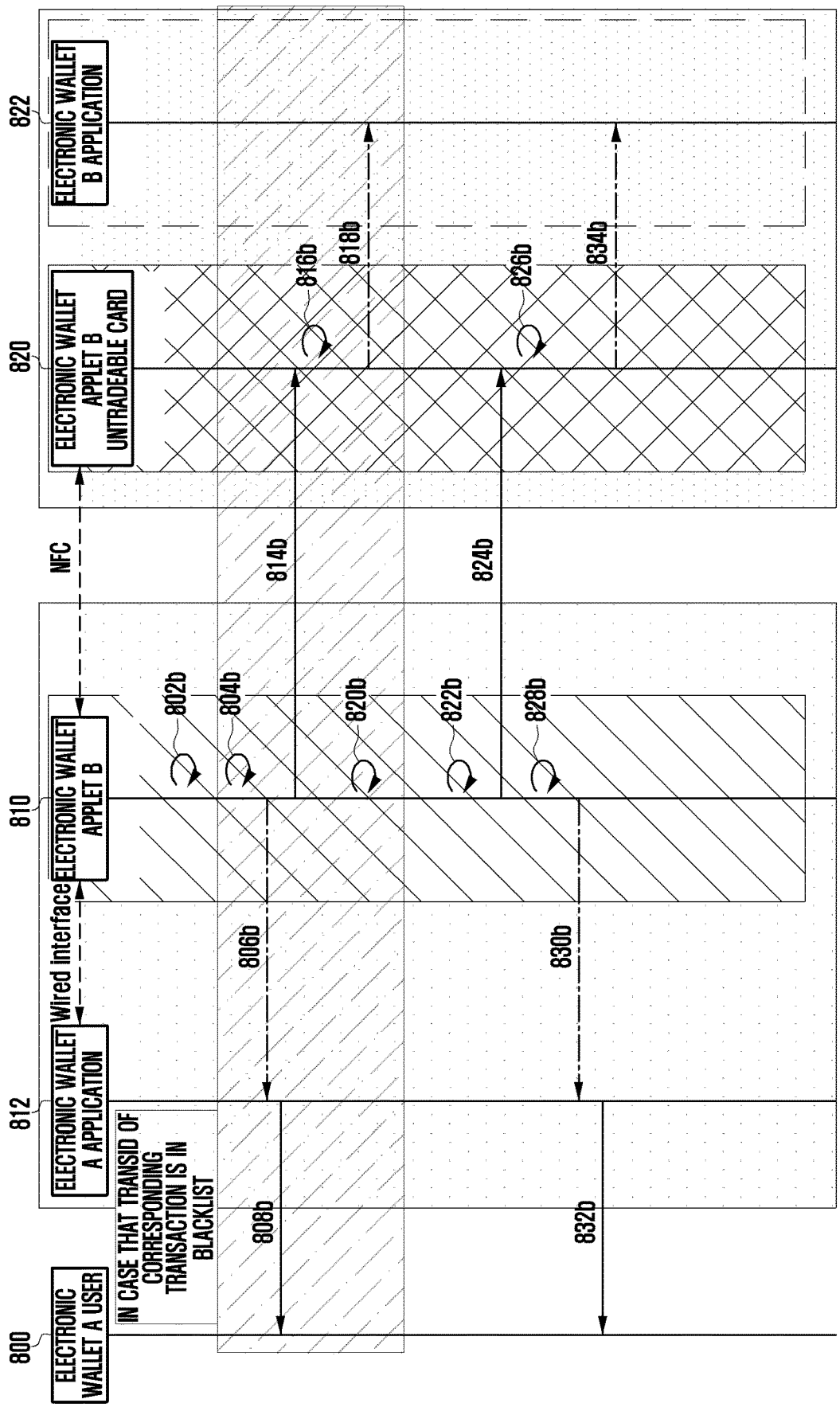

FIGS. 8A and 8B illustrate a process of reconfirming a payment when a payment is stopped due to an error situation of an electronic device according to various embodiments of the disclosure.

Referring to FIG. 8A, an application 812 of an electronic wallet A may receive information indicating progress of a stopped transaction from a user 800 of the electronic wallet A having performed a user authentication 802*a*. In response to the reception of information indicating the progress of the stopped transaction, the application 812 of the electronic wallet A may change the electronic device (e.g., the electronic device 300 of FIG. 3) in a reader mode at 804*a*, and may transfer information indicating the restart of the remittance transaction to the electronic wallet applet A 810 at (806*a*). The electronic wallet applet A 810 may start the polling in response to the identification of the information indicating the restart of the remittance transaction (814*a*). The polling may mean an operation in which one device periodically checks another device for the purpose of synchronization between a plurality of electronic devices, and if a predetermined condition is satisfied, the device proceeds with data processing, such as signal transmission and so on.

After the polling is completed, the electronic wallet applet A 810 may transmit information indicating that it is ready to operate in the reader mode to the application 812 of the electronic wallet A (808*a*).

The electronic wallet applet A 810 may identify the contact of the electronic wallet applet B 820, and may transmit a command for selecting the electronic wallet applet B 820 to the electronic wallet applet B 820 (818*a*). The electronic wallet applet B 820 may receive the command for selecting the electronic wallet applet B 820, and may transmit information indicating the ID of the electronic wallet applet B 820 to the electronic wallet applet A 810 (820*a*).

The electronic wallet applet A 810 may request a transaction history of a second state to the electronic wallet applet B 820. The second state may mean a state where the transaction approval of both participants has been completed and the balance increase/decrease of the wallet of either of the participants may have been completed. The electronic wallet applet B 820 may identify the corresponding transaction record from a stage log in response to the request for the history of the electronic wallet applet A 810 (824*a*), and may transmit the related transaction record information to the electronic wallet applet A 810 (826*a*). The electronic wallet applet A 810 may receive the related transaction record information, and may verify the transaction history. The electronic wallet applet A 810 may identify at least one of whether the transaction state is the second state, whether the transaction participants coincide with the electronic wallet A and the electronic wallet B, and information on the transaction history (e.g., signature (sig_A) and receipt signature (receiptsig_B)). If the verification of the transaction history has succeeded, the electronic wallet applet A 810 may confirm and end the transaction.

According to an embodiment of the disclosure, the electronic wallet applet A 810 may request processes of 816*a* to 826*a* from an online server on behalf of the electronic wallet applet B 820. In this case, the electronic wallet applet A 810 may verify the transaction history through reception of the related transaction record information from the online server on behalf of the electronic wallet applet B 820.

Referring to FIG. 8B, the electronic wallet applet A 810 may receive the related transaction record information, and may identify whether the transID of the corresponding transaction exists in the blacklist (802*b*). The electronic wallet applet A 810 may change the transaction to an initial state in response to the existence of the transID of the corresponding transaction in the blacklist (804*b*). The electronic wallet applet A 810 may transmit information indicating that the transaction has been initialized to the application 812 of the electronic wallet A (806*b*). The application 812 of the electronic wallet A may display, to the user, information indicating that the transaction has been initialized and information representing that the transaction is restored to the previous state (808*b*).

The electronic wallet applet A 810 may transmit at least one of the information indicating that the transaction has been initialized, the transID for notifying of the kind of the transaction, and the receipt signature (receiptsig_A) (814*b*). Thereafter, the electronic wallet applet A 810 may stop the polling (820*b*). The electronic wallet applet B 820 may receive the information indicating that the transaction has been initialized, and may determine the authenticity of the information by verifying the receipt signature (receiptsig_A). If the verification of the receipt signature (receiptsig_A) has succeeded, the electronic wallet applet B 820 may initialize the corresponding transaction, and may return the balance (e.g., x won) in the waiting state (816*b*). Thereafter, the electronic wallet applet B 820 may transmit the information indicating that the transaction has been initialized and the untradeable state has been released to the application 822 of the electronic wallet B (818*b*).

The electronic wallet applet A 810 may change the transaction to a confirmation state in response to the nonexistence of the transID of the corresponding transaction in the blacklist, and may generate the receipt signature (receiptsig_A) (822*b*). The electronic wallet applet A 810 may transmit at least one of information indicating that the transaction has been confirmed, the transID for notifying of the kind of the transaction, and the receipt signature (receiptsig_A) to the electronic wallet applet B 820 (824*b*). Thereafter, the electronic wallet applet A 810 may stop the polling (828*b*). The electronic wallet applet A 810 may transmit the information indicating that the transaction has been confirmed to the application 812 of the electronic wallet A (830*b*). The application 812 of the electronic wallet A may display the information indicating that the transaction has been confirmed to the user (832*b*).

The electronic wallet applet B 820 may receive at least one of the information indicating that the transaction has been confirmed, the transID for notifying of the kind of the transaction, and the receipt signature (receiptsig_A). The electronic wallet applet B 820 may grasp the transaction information by using the received transID, and may verify the receipt signature (receiptsig_A). if the verification of the receipt signature (receiptsig_A) has succeeded, the electronic wallet applet B 820 may confirm the transaction, and may confirm the amount (e.g., x won) in the waiting state in the electronic wallet B. The electronic wallet applet B 820 may delete the transaction record from the stage log, and may separately store the transaction record in the transaction log (826*b*). The electronic wallet applet B 820 may transmit the information indicating the transaction confirmation to the application 822 of the electronic wallet B, and may release the untradeable state (834*b*).

Figure 9:
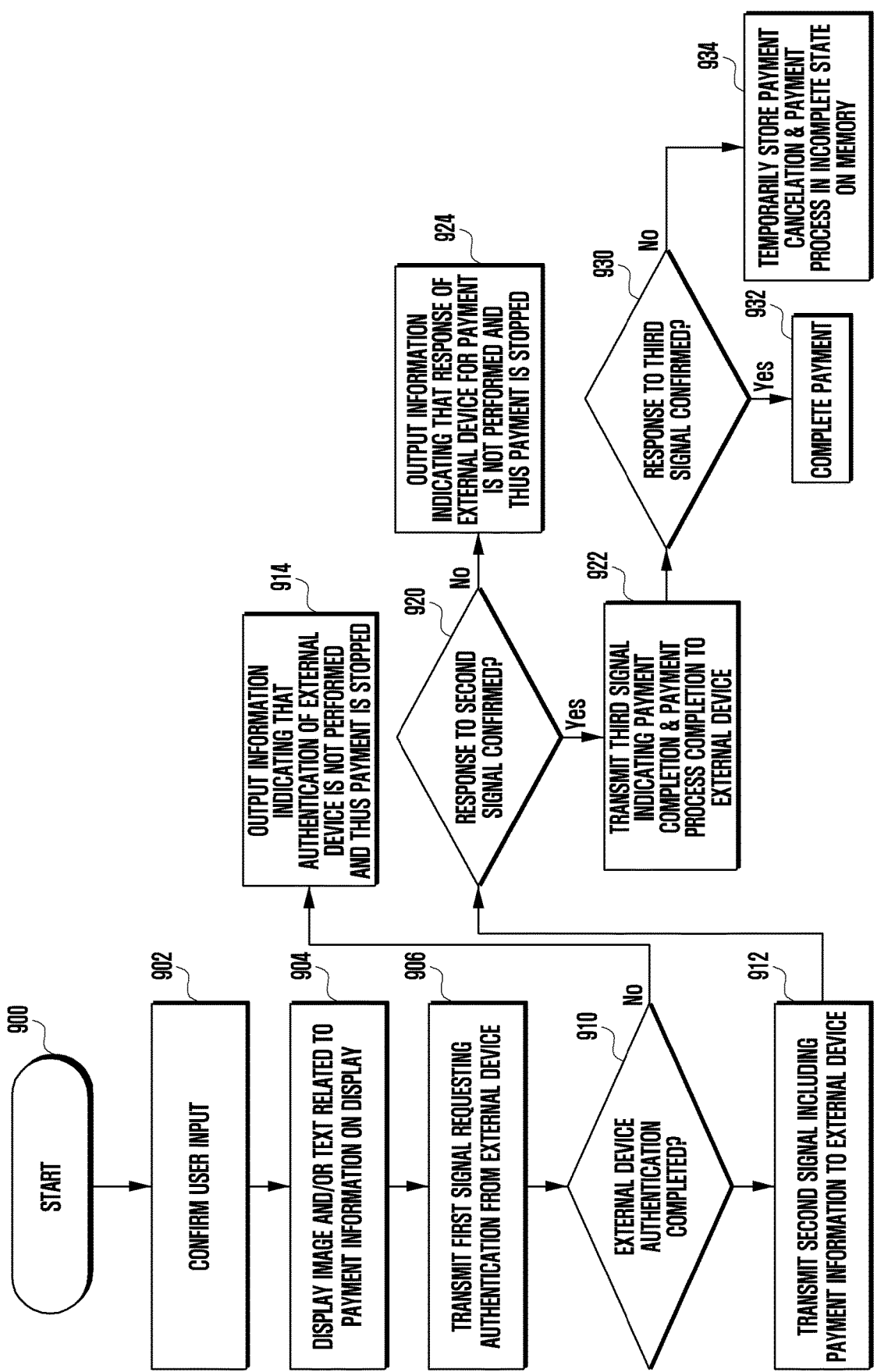
FIG. 9 is a flowchart illustrating a payment method of an electronic device according to an embodiment of the disclosure.

FIG. 9 is a flowchart illustrating a payment method of an electronic device according to an embodiment of the disclosure.

Referring to FIG. 9, the illustrated method 900 may be executed by the electronic device (e.g., the electronic device 300 of FIG. 3) as described above through FIGS. 1 to 4, 5A, 5B, 6A to 6F, 7A to 7E, 8A and 8B, and the above-described technical features will be omitted hereinafter.

At operation 902, the electronic device (e.g., the electronic device 300 of FIG. 3) may identify a user input. For example, an application of an electronic wallet A (e.g., the application 612 of the electronic wallet A of FIGS. 6A and 6B) may receive a first command to remit a specific amount (e.g., x won) from a user of the electronic wallet A (e.g., the user 600 of the electronic wallet A of FIGS. 6A and 6B) having performed the user authentication (e.g., the 602*a* of FIG. 6A) to another external device (e.g., an electronic wallet B). The first command may mean a remittance transaction start command.

At operation 904, the electronic device 300 may display an image and/or text related to the first command on the display (e.g., the display 330 of FIG. 3). The image and/or text related to the first command may include indication information for requesting the amount to be deposited to or to be withdrawn from a user.

At operation 906, the electronic device 300 may transmit the first signal for requesting the authentication to the external device (e.g., the external device 302 of FIG. 3) in response to the user input. The electronic wallet applet A (e.g., the electronic wallet applet A 610 of FIGS. 6A and 6B) may request the electronic wallet certificate (Cert_B) from the electronic wallet applet B (e.g., the electronic wallet applet B 620), and the electronic wallet applet B may transmit the electronic wallet certificate (Cert_B) to the electronic wallet applet A 610 in response to the request from the electronic wallet applet A 610. The electronic wallet applet A 610 may receive and verify the electronic wallet certificate (Cert_B) from the electronic wallet applet B 620. If the verification of the electronic wallet certificate (Cert_B) has succeeded, the electronic wallet applet A 610 may extract the public key (PK_B) of the electronic wallet applet B 620. The electronic wallet applet A 610 may generate a random byte A (random A) for transaction identification, and may transmit the same together with its own certificate (Cert_A) and the remittance transaction start command to the electronic wallet applet B 620.

At operation 910, the electronic device 300 may receive the authentication related information (e.g., the electronic wallet certificate (Cert_B), and may execute the authentication for transaction with the external device 302. The electronic device 300 may output information indicating that the authentication of the external device 302 has not been performed at operation 914 and thus the payment has been stopped in response to the authentication failure of the external device 302.

At operation 912, the electronic device 300 may transmit the second signal including the payment information to the external device 302 in response to the authentication success of the external device 302. According to an embodiment of the disclosure, the second signal may include at least one of authentication information of the electronic device 300 or information indicating the execution of the payment process. The electronic wallet applet B 620 may verify the certificate (Cert_A) of the electronic wallet applet A 610, and may extract the public key (PK_A) of the electronic wallet applet A 610. The electronic wallet applet B 620 may generate a random byte B (random B) for transaction identification, and may generate a transaction ID together with the received random byte A (random A). The electronic device 300 may distinguish not only the IDs of the devices that participate in the payment but also what kind of transaction is performed by using the transaction ID. For example, if there are remittance payment of 10,000 won and remittance payment of 20,000 won between the electronic devices A and B, the electronic device A may distinguish that the other party of the payment is the electronic device B, and may distinguish whether the payment is the remittance payment of 10,000 won or the remittance payment of 20,000 won as well. The transaction amount is merely exemplary, and the transaction history may be distinguished depending on not only the transaction amount but also the transaction date.

The electronic wallet applet B 620 may generate a message to be signed after defining the transaction ID, and may generate a signature message (sig_B) by signing with a secret key (SK_B) of the electronic wallet applet B 620. The signed message may include the contents related to at least one of transID, transaction amount, ID_A, ID_B, PK_A (or CERT_A), and PK_B (or Cert_B).

At operation 920, the electronic device 300 may identify the response of the external device 302 to the second signal. At operation 924, the electronic device 300 may output the information indicating that the response of the external device 302 to the payment is not made and the payment has been stopped in response to a state where the response of the external device to the second signal has not been identified.

At operation 922, the electronic device 300 may transmit the third signal including the information indicating that the payment has been completed to the external device 302 in response to the identification of the response of the external device to the second signal. According to an embodiment of the disclosure, the third signal may include at least one of the transaction history information of the payment process or information indicating the completion of the payment process.

At operation 930, the electronic device 300 may identify the response of the external device 302 to the third signal. At operation 934, the electronic device 300 may output the information indicating that the response of the external device 302 to the payment is not made and the payment has not been completed in response to a state where the response of the external device to the third signal has not been identified. Further, the electronic device 300 may temporarily store the information indicating that the payment has not been completed in the memory (e.g., the memory 320 of FIG. 3). At operation 932, the electronic device 300 may complete the payment in response to the identification of the response of the external device to the third signal.

An electronic device according to various embodiments may include a communication module communicable with an external device, a display, a memory, and a processor operatively connected to the communication module, wherein the processor is configured to display at least one image and/or text related to payment information on the display in response to at least a part of a user input, determine whether to start a payment process using the electronic device in response to identification of a user authentication, transmit a first signal for requesting an authentication to the external device in response to identification of an approach of the external device within a predetermined distance from the electronic device, and transmit a second signal related to the payment process by using the communication module in response to identification of an authentication of the external device, determine whether to complete the payment process using the electronic device in response to identification of a response of the external device for the second signal, and transmit a third signal for indicating that the payment process has been completed to the external device by using the communication module in response to determination of a completion of the payment process, and control the external device to be in an untradeable state in response to a case where the response of the external device for the third signal is unable to be identified within a predetermined time after the third signal is transmitted.

According to an embodiment of the disclosure, the processor may be configured to control to temporarily store data related to the payment process in an incomplete state in the memory in response to the case where the response of the external device for the third signal is unable to be identified within a predetermined time after the third signal is transmitted, and output, on the display, information indicating that the external device may be maintained in the untradeable state in case that an abnormal operation occurs in the payment process, and the external device is unable to re-approach within the predetermined distance from the electronic device, in response to identification of the storage of the data related to the payment process in the incomplete state.

According to an embodiment of the disclosure, the processor may be configured to output, on the display, information indicating existence of a transaction stored in the incomplete state in response to the identification of the storage of the data related to the payment process in the incomplete state, and output, on the display, transaction information stored in the incomplete state in response to the user input.

According to an embodiment of the disclosure, the processor may be configured to control to output, on the display, information for requesting to make the external device approach within the predetermined distance from the electronic device, and control to re-proceed with the payment process in response to the approach of the external device or to completely end the payment processor in response to the at least a part of the user input.

According to an embodiment of the disclosure, the processor may be configured to cancel the payment process based on the case where the response of the external device for the third signal is unable to be identified within a predetermined time after the third signal is transmitted, and output, on the display, information indicating that the payment process has been canceled.

According to an embodiment of the disclosure, the processor may be configured to control not to complete the payment process based on that the response of the external device for the second signal is unable to be identified within a predetermined time after the second signal is transmitted, and output, on the display, information indicating whether to store an identification (ID) of the external device in a blacklist in the memory.

According to an embodiment of the disclosure, the processor may be configured to store the identification (ID) of the external device in the blacklist in the memory in response to the at least a part of the user input.

According to an embodiment of the disclosure, the processor may be configured to complete the payment process in response to the identification of the response of the external device for the third signal, and output, on the display, information indicating that the payment process has been completed.

According to an embodiment of the disclosure, the processor may be configured to transmit the first signal for requesting the authentication to the external device in response to identification in that the external device performs a tagging operation to approach within the predetermined distance from the electronic device, and output, on the display, information indicating that a transaction with the external device is not possible in response to a case that the authentication of the external device is not identified.

According to an embodiment of the disclosure, the second signal may include at least one of transaction history information of the payment process, authentication information of the electronic device, or information indicating performing of the payment process.

According to an embodiment of the disclosure, the third signal may include at least one of transaction history information of the payment process or information indicating the completion of the payment process.

According to an embodiment of the disclosure, the processor may be configured to identify an identification (ID) of the external device in a blacklist in the memory and confirm a transaction of the payment process in response to reception of a transaction confirmation request of the payment process that is temporarily stored in the memory in an incomplete state from a server operatively connected to the electronic device and the external device, and transmit information indicating that the transaction has been confirmed to the server by using the communication module.

A payment method using an electronic device may include displaying at least one image and/or text related to payment information on the display in response to at least a part of a user input, determining whether to start a payment process using the electronic device in response to identification of a user authentication, transmitting a first signal for requesting an authentication to the external device by using a communication module in response to identification of an approach of the external device within a predetermined distance from the electronic device, transmitting a second signal related to the payment process by using the communication module in response to identification of an authentication of the external device, determining whether to complete the payment process using the electronic device in response to identification of a response of the external device for the second signal, and transmitting a third signal for indicating that the payment process has been completed to the external device by using the communication module in response to determination of a completion of the payment process, and controlling the external device to be in an untradeable state in response to a case where the response of the external device for the third signal is unable to be identified within a predetermined time after the third signal is transmitted.

According to an embodiment of the disclosure, the payment method using the electronic device may further include controlling to temporarily store data related to the payment process in an incomplete state in the memory in response to the case where the response of the external device for the third signal is unable to be identified within a predetermined time after the third signal is transmitted, and outputting, on the display, information indicating that the external device may be maintained in the untradeable state in case that an abnormal operation occurs in the payment process, and the external device is unable to re-approach within the predetermined distance from the electronic device, in response to identification of the storage of the data related to the payment process in the incomplete state.

According to an embodiment of the disclosure, the payment method using the electronic device may further include outputting, on the display, information indicating existence of a transaction stored in the incomplete state in response to the identification of the storage of the data related to the payment process in the incomplete state, and outputting, on the display, transaction information stored in the incomplete state in response to the user input.

According to an embodiment of the disclosure, the payment method using the electronic device may further include controlling to output, on the display, information for requesting to make the external device approach within the predetermined distance from the electronic device, and controlling to re-proceed with the payment process in response to the approach of the external device or to completely end the payment processor in response to the at least a part of the user input.

According to an embodiment of the disclosure, the payment method using the electronic device may further include cancelling the payment process based on the case where the response of the external device for the third signal is unable to be identified within a predetermined time after the third signal is transmitted, and outputting, on the display, information indicating that the payment process has been canceled.

According to an embodiment of the disclosure, the payment method using the electronic device may further include completing the payment process in response to the identification of the response of the external device for the third signal, and outputting, on the display, information indicating that the payment process has been completed.

According to an embodiment of the disclosure, transmitting the first signal for requesting the authentication to the external device in response to identification in that the external device performs the tagging operation to approach within the predetermined distance from the electronic device may further include outputting, on the display, information indicating that a transaction with the external device is not possible in response to a case that the authentication of the external device is not identified.

According to an embodiment of the disclosure, the payment method using the electronic device may further include: identifying an identification (ID) of the external device in a blacklist in the memory and confirming a transaction of the payment process in response to reception of a transaction confirmation request of the payment process from a server operatively connected to the electronic device and the external device, and transmitting information indicating that the transaction has been confirmed to the server by using the communication module.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a communication circuitry;
   a display;
   one or more processors; and
   memory storing instructions that, when executed by the one or more processors, cause the electronic device to;
   display at least one image and/or text related to payment information on the display,
   perform an authentication of a user based on a user input,
   in accordance with the authentication of the user being successful, detect an approach of an external device within a predetermined distance from the electronic device,
   transmit, via the communication circuitry, a first signal for requesting an authentication of the external device to the external device,
   receive, via the communication circuitry, a first response signal including a certificate of the external device,
   perform the authentication of the external device based on the certificate of the external device,
   in accordance with the authentication of the external device being successful, transmit, via the communication circuitry, a second signal related to a payment process to the external device,
   receive, via the communication circuitry, a second response signal corresponding the second signal from the external device,
   in response to receiving the second response signal, transmit, via the communication circuitry, a third signal for indicating that the payment process has been completed to the external device, and
   in accordance with a third response signal corresponding the third signal being not identified within a predetermined time after third signal is transmitted, cause the external device to be in an untradeable state.

2. The electronic device of claim 1, wherein the instructions, when executed by the one or more processors, cause the electronic device to:
   control to temporarily store data related to the payment process in an incomplete state in the memory in response to the case where a response of the external device for the third signal is unable to be identified within a predetermined time after the third signal is transmitted, and
   output, on the display, information indicating that the external device may be maintained in the untradeable state in case that an abnormal operation occurs in the payment process, and the external device is unable to re-approach within the predetermined distance from the electronic device, in response to identification of a storage of the data related to the payment process in the incomplete state.

3. The electronic device of claim 2, wherein the instructions, when executed by the one or more processors, cause the electronic device to:
   output, on the display, information indicating existence of a transaction stored in the incomplete state in response to the identification of the storage of the data related to the payment process in the incomplete state, and
   output, on the display, transaction information stored in the incomplete state in response to the user input.

4. The electronic device of claim 2, wherein the instructions, when executed by the one or more processors, cause the electronic device to:
   control to output, on the display, information for requesting to make the external device approach within the predetermined distance from the electronic device, and
   control to re-proceed with the payment process in response to the approach of the external device or to completely end a payment processor in response to the at least a part of the user input.

5. The electronic device of claim 1, wherein the instructions, when executed by the one or more processors, cause the electronic device to:
   cancel the payment process based on the case where a response of the external device for the third signal is unable to be identified within a predetermined time after the third signal is transmitted, and
   output, on the display, information indicating that the payment process has been canceled.

6. The electronic device of claim 1, wherein the instructions, when executed by the one or more processors, cause the electronic device to:
   control not to complete the payment process based on that a response of the external device for the second signal is unable to be identified within a predetermined time after the second signal is transmitted, and
   output, on the display, information indicating whether to store an identification (ID) of the external device in a blacklist in the memory.

7. The electronic device of claim 6, wherein the instructions, when executed by the one or more processors, cause the electronic device to store the identification (ID) of the external device in the blacklist in the memory in response to the at least a part of the user input.

8. The electronic device of claim 1, wherein the instructions, when executed by the one or more processors, cause the electronic device to:
   complete the payment process in response to the identification of a response of the external device for the third signal, and
   output, on the display, information indicating that the payment process has been completed.

9. The electronic device of claim 1, wherein the instructions, when executed by the one or more processors, cause the electronic device to:
   transmit, via the communication circuitry, the first signal for requesting the authentication of the external device to the external device, and
   output, on the display, information indicating that a transaction with the external device is not possible in response to a case that the authentication of the external device is not identified.

10. The electronic device of claim 1, wherein the second signal comprises at least one of transaction history information of the payment process, authentication information of the electronic device, or information indicating performing of the payment process.

11. The electronic device of claim 1, wherein the third signal comprises at least one of transaction history information of the payment process or information indicating the completion of the payment process.

12. The electronic device of claim 1, wherein the instructions, when executed by the one or more processors, cause the electronic device to:
- identify an identification (ID) of the external device in a blacklist in the memory,
- confirm a transaction of the payment process in response to reception of a transaction confirmation request of the payment process that is temporarily stored in the memory in an incomplete state from a server operatively connected to the electronic device and the external device, and
- transmit information indicating that the transaction has been confirmed to the server by using the communication circuitry.

13. A payment method using an electronic device, the method comprising:
- displaying at least one image and/or text related to payment information on a display of the electronic device;
- performing an authentication of a user based on a user input;
- in accordance with the authentication of the user being successful, detecting an approach of an external device within a predetermined distance from the electronic device;
- transmitting, via a communication circuitry of the electronic device, a first signal for requesting an authentication of the external device to the external device;
- receiving, via the communication circuitry, a first response signal including a certificate of the external device;
- performing the authentication of the external device based on the certificate of the external device;
- in accordance with the authentication of the external device being successful, transmitting, via the communication circuitry, a second signal related to a payment process to the external device;
- receiving, via the communication circuitry, a second response signal corresponding the second signal from the external device;
- in response to receiving the second response signal, transmit, via the communication circuitry, a third signal for indicating that the payment process has been completed to the external device; and
- in accordance with a third response signal corresponding the third signal being not identified within a predetermined time after third signal is transmitted, causing the external device to be in an untradeable state.

14. The method of claim 13, further comprising:
- controlling to temporarily store data related to the payment process in an incomplete state in a memory of the electronic device in response to the case where a response of the external device for the third signal is unable to be identified within a predetermined time after the third signal is transmitted; and
- outputting, on the display, information indicating that the external device may be maintained in the untradeable state in case that an abnormal operation occurs in the payment process, and the external device is unable to re-approach within the predetermined distance from the electronic device, in response to identification of a storage of the data related to the payment process in the incomplete state.

15. The method of claim 14, further comprising:
- outputting, on the display, information indicating existence of a transaction stored in the incomplete state in response to the identification of the storage of the data related to the payment process in the incomplete state; and
- outputting, on the display, transaction information stored in the incomplete state in response to the user input.

16. The method of claim 14, further comprising:
- controlling to output, on the display, information for requesting to make the external device approach within the predetermined distance from the electronic device; and
- controlling to re-proceed with the payment process in response to the approach of the external device or to completely end a payment processor in response to the at least a part of the user input.

17. The method of claim 13, further comprising:
- cancelling the payment process based on the case where a response of the external device for the third signal is unable to be identified within a predetermined time after the third signal is transmitted; and
- outputting, on the display, information indicating that the payment process has been canceled.

18. The method of claim 13, further comprising:
- completing the payment process in response to the identification of a response of the external device for the third signal; and
- outputting, on the display, information indicating that the payment process has been completed.

19. The method of claim 13, wherein the transmitting, via the communication circuitry, of the first signal for requesting the authentication to the external device further comprises:
- outputting, on the display, information indicating that a transaction with the external device is not possible in response to a case that the authentication of the external device is not identified.

20. The method of claim 13, further comprising:
- identifying an identification (ID) of the external device in a blacklist in a memory of the electronic device and confirming a transaction of the payment process in response to reception of a transaction confirmation request of the payment process from a server operatively connected to the electronic device and the external device; and
- transmitting information indicating that the transaction has been confirmed to the server by using the communication circuitry.

* * * * *